(12) United States Patent
Liang et al.

(10) Patent No.: US 9,628,684 B2
(45) Date of Patent: Apr. 18, 2017

(54) LIGHT-FIELD ABERRATION CORRECTION

(71) Applicant: Lytro, Inc., Mountain View, CA (US)

(72) Inventors: Chia-Kai Liang, San Jose, CA (US); Colvin Pitts, Snohomish, WA (US); Carl (Warren) Craddock, San Francisco, CA (US); Graham Butler Myhre, San Francisco, CA (US)

(73) Assignee: Lytro, Inc., Mountain View, CA (US)

( * ) Notice: Subject to any disclaimer, the term of this patent is extended or adjusted under 35 U.S.C. 154(b) by 159 days.

(21) Appl. No.: 14/573,319

(22) Filed: Dec. 17, 2014

(65) Prior Publication Data

US 2015/0178923 A1 Jun. 25, 2015

Related U.S. Application Data

(60) Provisional application No. 61/920,709, filed on Dec. 24, 2013, provisional application No. 61/920,710, filed on Dec. 24, 2013.

(51) Int. Cl.
*H04N 5/217* (2011.01)
*H04N 5/225* (2006.01)
*H04N 17/00* (2006.01)
*H04N 5/357* (2011.01)
*G02B 27/00* (2006.01)

(52) U.S. Cl.
CPC ....... *H04N 5/2254* (2013.01); *G02B 27/0075* (2013.01); *H04N 5/3572* (2013.01); *H04N 17/002* (2013.01)

(58) Field of Classification Search
None
See application file for complete search history.

(56) References Cited

U.S. PATENT DOCUMENTS

| 6,466,207 B1 | 10/2002 | Gortler et al. |
| 7,336,430 B2 | 2/2008 | George |
| 7,620,309 B2 | 11/2009 | Georgiev |
| 7,623,726 B1 | 11/2009 | Georgiev |
| 7,936,392 B2 | 5/2011 | Ng et al. |
| 7,949,252 B1 | 5/2011 | Georgiev |
| 8,189,089 B1 | 5/2012 | Georgiev et al. |
| 8,264,546 B2 | 9/2012 | Witt |
| 8,289,440 B2 | 10/2012 | Knight et al. |

(Continued)

OTHER PUBLICATIONS

Dowski, Jr., Edward R., "Extended depth of field through wavefront coding", Applied Optics, vol. 34, No. 11, Apr. 10, 1995, pp. 1859-1866.

(Continued)

*Primary Examiner* — Stephen Coleman
(74) *Attorney, Agent, or Firm* — Raubvogel Law Office

(57) ABSTRACT

According to various embodiments, the system and method disclosed herein serve to at least partially compensate for departures of an actual main lens of a light-field camera from the properties of an ideal main lens. Light-field data may be captured and processed through the use of product calibration data and unit calibration data. The product calibration data may be descriptive of departure of a main lens design of the light-field camera from an ideal main lens design. The unit calibration data may be descriptive of departure of the actual main lens of the light-field camera from the main lens design. Corrected light-field data may be generated as a result of the processing, and may be used to generate a light-field image.

27 Claims, 17 Drawing Sheets

(56) References Cited

U.S. PATENT DOCUMENTS

| | | |
|---|---|---|
| 8,290,358 B1 | 10/2012 | Georgiev |
| 8,427,548 B2 | 4/2013 | Lim et al. |
| 8,442,397 B2 | 5/2013 | Kang et al. |
| 8,559,705 B2 | 10/2013 | Ng |
| 8,570,426 B2 | 10/2013 | Pitts et al. |
| 8,724,014 B2 | 5/2014 | Ng et al. |
| 8,749,620 B1 | 6/2014 | Knight et al. |
| 8,811,769 B1 | 8/2014 | Pitts et al. |
| 8,831,377 B2 | 9/2014 | Pitts et al. |
| 2005/0031203 A1 | 2/2005 | Fukuda |
| 2007/0071316 A1 | 3/2007 | Kubo |
| 2007/0230944 A1 | 10/2007 | Georgiev |
| 2007/0252074 A1 | 11/2007 | Ng et al. |
| 2008/0131019 A1 | 6/2008 | Ng |
| 2009/0128669 A1 | 5/2009 | Ng et al. |
| 2010/0026852 A1 | 2/2010 | Ng et al. |
| 2010/0141802 A1 | 6/2010 | Knight et al. |
| 2012/0287296 A1 | 11/2012 | Fukui |
| 2012/0327222 A1 | 12/2012 | Ng et al. |
| 2013/0113981 A1 | 5/2013 | Knight et al. |
| 2013/0128081 A1 | 5/2013 | Georgiev et al. |
| 2013/0222606 A1 | 8/2013 | Pitts et al. |
| 2013/0222652 A1 | 8/2013 | Akeley et al. |
| 2013/0286236 A1 | 10/2013 | Mankowski |
| 2014/0146201 A1 | 5/2014 | Knight et al. |
| 2014/0176592 A1 | 6/2014 | Wilburn et al. |

OTHER PUBLICATIONS

Georgiev, Todor, et al., "Superresolution with Plenoptic 2.0 Cameras", Optical Society of America 2009, pp. 1-3.

Heide, Felix, et al., "High-Quality Computational Imaging Through Simple Lenses", ACM Transactions on Graphics, SIGGRAPH 2013, pp. 1-7.

Levoy, Marc, "Light Field Photography and Videography", Oct. 18, 2005.

"Raytrix Lightfield Camera", Raytrix GmbH, Germany 2012, pp. 1-35.

Adaptive optics: http://http://en.wikipedia.org/wiki/Adaptive_optics. Retrieved Feb. 2014.

LIGHT-FIELD ABERRATION CORRECTION

CROSS-REFERENCE TO RELATED APPLICATIONS

The present application claims the benefit of U.S. Provisional Application Ser. No. 61/920,709 for "Plenoptic Camera Resolution Using an Aberrated Main Lens", filed Dec. 24, 2013, the disclosure of which is incorporated herein by reference in its entirety.

The present application claims the benefit of U.S. Provisional Application Ser. No. 61/920,710 for "Light Field Aberration Correction", filed Dec. 24, 2013, the disclosure of which is incorporated herein by reference in its entirety.

The present application is related to U.S. Utility application Ser. No. 12/278,708, for "Correction of Optical Aberrations", filed Jan. 26, 2009, now U.S. Pat. No. 8,243,157, the disclosure of which is incorporated herein by reference in its entirety.

The present application is related to U.S. Utility application Ser. No. 13/774,971, for "Compensating for Variation in Microlens Position During Light-Field Image Processing", filed Feb. 22, 2013, the disclosure of which is incorporated herein by reference in its entirety.

The present application is related to U.S. Utility application Ser. No. 13/774,925 for "Compensating for Sensor Saturation and Microlens Modulation During Light-Field Image Processing", filed Feb. 22, 2013, the disclosure of which is incorporated herein by reference in its entirety.

The present application is related to U.S. Utility application Ser. No. 13/688,026, for "Extended Depth of Field and Variable Center of Perspective in Light-Field Processing", filed Nov. 28, 2012, the disclosure of which is incorporated herein by reference in its entirety.

The present application is related to U.S. Utility application Ser. No. 14/573,651, for "Improving Plenoptic Camera Resolution", filed on the same date as the present application, the disclosure of which is incorporated herein by reference in its entirety.

TECHNICAL FIELD

The present disclosure relates to light-field image capture, and more specifically, to systems and methods for correcting for aberrations in the design and/or manufacture of lenses of light-field image capture devices.

BACKGROUND

As discussed in R. Ng, "Digital Light Field Photography," Dissertation, Department of Computer Science, Stanford University, June 2006 and in Ng et al., U.S. patent application Ser. No. 12/278,708, for "Correction of Optical Aberrations", filed Jan. 26, 2009, a light-field camera can digitally correct for aberrations of the main lens. In a traditional 2D camera, aberration in the lens causes the lens to focus to a large spot size, resulting in reduced resolving power.

However, as described in the above-cited related provisional application, traditional lens design principles do not necessarily apply to light-field cameras. In a light-field camera, optical deviations from an ideal geometric thin lens (referred to as aberrations) can be digitally corrected by capturing the individual light rays. In fact, in some applications, as discussed in the above-cited related U.S. Provisional Application Ser. No. 61/920,709, light-field camera performance can be improved by intentionally adding aberration to the lens.

One issue that arises in construction of lenses for light-field cameras is that, even if the lens of the light-field camera can be constructed with the desired properties, the solution is not always easily scalable to a large system that can support all shipping units under various lens configurations (zoom/focus).

SUMMARY

In recognition of the above-described problems, various embodiments provide mechanisms for processing the light-field with aberration correction, and/or correction based on other optical distortion. In at least one embodiment, the system includes, for example, four main processing stages, although one skilled in the art will recognize that such stages can be implemented singly or in any suitable combination with one another:

One-Time, Per-Product Offline Processing

In this stage, ideal lens system prescriptions from the design specification of an optical system are taken, in order to generate high-resolution aberration correction data. The resolution of the aberration correction data is high enough to generate high-quality results, although in some cases it may be too large to store, transfer, or manage.

In at least one embodiment, the system uses an aberration data modeling algorithm to convert the high-resolution aberration correction data into a compact representation. Any of a number of candidate algorithms can be used. For example, in at least one embodiment the system uses 4D table re-sampling and filtering. The output compact data faithfully represents the aberration correction information, and allows retargeting, which is a useful feature for the additional processing as described below.

One-Time, Per-Unit Offline Processing.

Any particular manufactured unit can deviate from the design due to any of a number of reasons, including, for example, lens axis tilting, optical center shifting, microlens array geometry mismatch, and the like. According to at least one embodiment, one or more calibration processing steps are performed during the manufacturing process to estimate the parameters for describing these variations. The calibration may require special charts to image, and multiple calibrations can be required for different system configurations (lens focus/zoom, exposure, and the like).

Per-Image Processing

In normal use cases, after the shutter button is pressed, the system obtains the raw image/light-field data and the corresponding system configuration information.

In at least one embodiment, a retargeting algorithm is performed to convert the compact aberration correction data to match the characteristics of the incoming image, as follows:

Given the target lens configuration, the system finds the compact aberration correction data with similar or identical configurations. In at least one embodiment, the system can interpolate among two or more candidates.

Given the target camera configuration, the system converts the compact aberration correction data to the high-resolution aberration correction data that matches the camera configuration. In at least one embodiment, this step includes 4D table resampling and back-projection.

Given the retargeted aberration correction data, the system can correct the incoming light-field. This can be done, for example, by warping the light-field and/or by correcting the 4D coordinates during each light-field processing stage (for example, at projection, depth estimation, and the like).

Optional Validation Processing

In some cases, it is useful to know the performance of the aberration correction. In at least one embodiment, the system applies an aberration correction assessment algorithm to check if the aberration correction has been applied correctly. The algorithm may be based, for example, on an epipolar image (EPI) analysis technique as follows:

Generate the EPI from the aberration corrected light-field.

Identify the strong edges in the EPI.

Fit each edge with a line equation and measure the error. When the error is large, it means the edge is "curved" in the x-u space, and the aberration was not perfectly corrected.

Because the degree of aberration is subject to spatial variation, in at least one embodiment the system checks the correction result at multiple regions. Since the EPI analysis is more reliable in areas of the image having strong edges at fixed depths, a lookup table or chart may be used for this stage.

The system and method described herein may provide several advantages over prior techniques. Such advantages may include, but need not be limited to, the following:

The per-product and per-unit one-time offline processing can significantly reduce the computation required for each captured light-field.

Modeling and retargeting the compact aberration correction data significantly reduce the amount of data to transfer. The system described herein can avoid the need to estimate the full high-resolution aberration correction data for each assembled camera at each configuration.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

Figure 1:
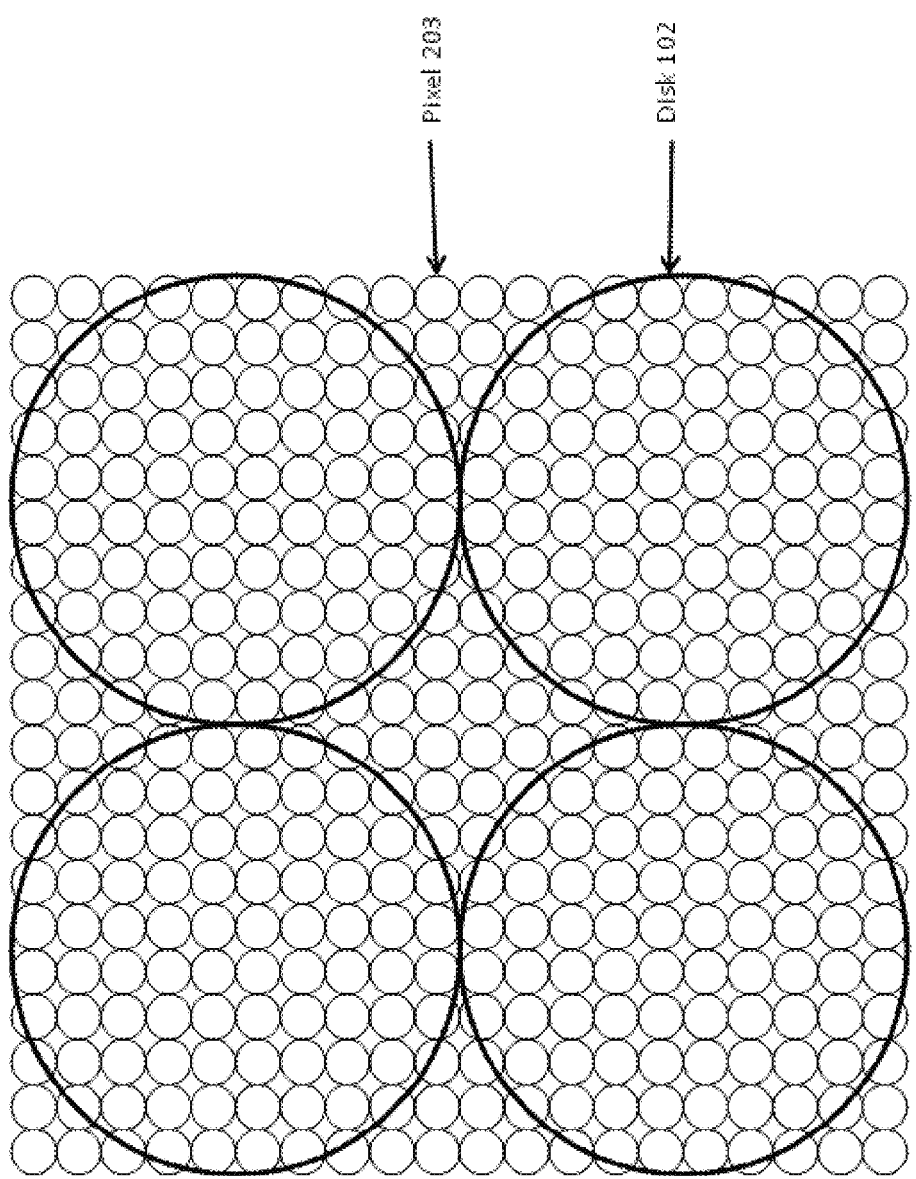
FIG. 1 depicts a portion of a light-field image.

For purposes of the description provided herein, the following definitions are used:

aberration: an accidentally or deliberately produced feature of a main lens that results in departure of the main lens from the characteristics of an ideal lens.

correction: a step taken to at least partially compensate for the effects of an aberration.

disk: a region in a light-field image that is illuminated by light passing through a single microlens; may be circular or any other suitable shape.

extended depth of field (EDOF) image: an image that has been processed to have objects in focus along a greater depth range.

image: a two-dimensional array of pixel values, or pixels, each specifying a color.

image processing algorithm: any computer-implemented procedure for modifying an image.

light-field data: data that describes the properties of a light-field, typically captured by a light-field capture device.

light-field image: an image that contains a representation of light-field data captured at the sensor.

main lens: the optical structure or structures through which light enters a camera, prior to impinging on a microlens array or sensor.

mapping: a table, function, or other data set or mathematical structure that provides one or more output values for each of a plurality of possible input values or combinations of input values.

microlens: a small lens, typically one in an array of similar microlenses.

modeling: a process by which a table, function, or other data set or mathematical structure is created to approximate the operation of a different system, data set, or mathematical structure.

phase mask: a camera component used in conjunction with a main lens to impart a phase shift on the wavefront of light.

ray correction function: a function that converts between four-dimensional light ray coordinates in actual image space corresponding to the use of an actual main lens, and four-dimensional light ray coordinates in ideal space corresponding to the use of an ideal main lens.

raytracing: a method of modeling light by which individual bundles of light are projected through a virtual space.

sensor location: a specific position on a sensor such as an image sensor, typically defined in Cartesian coordinates.

weight: a numerical representation of the importance accorded to a specific component in the construction of a combination of components.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for designing and/or selecting light-field camera components are described. One skilled in the art will recognize that these various techniques and methods can be performed singly and/or in any suitable combination with one another.

Architecture

Figure 2:
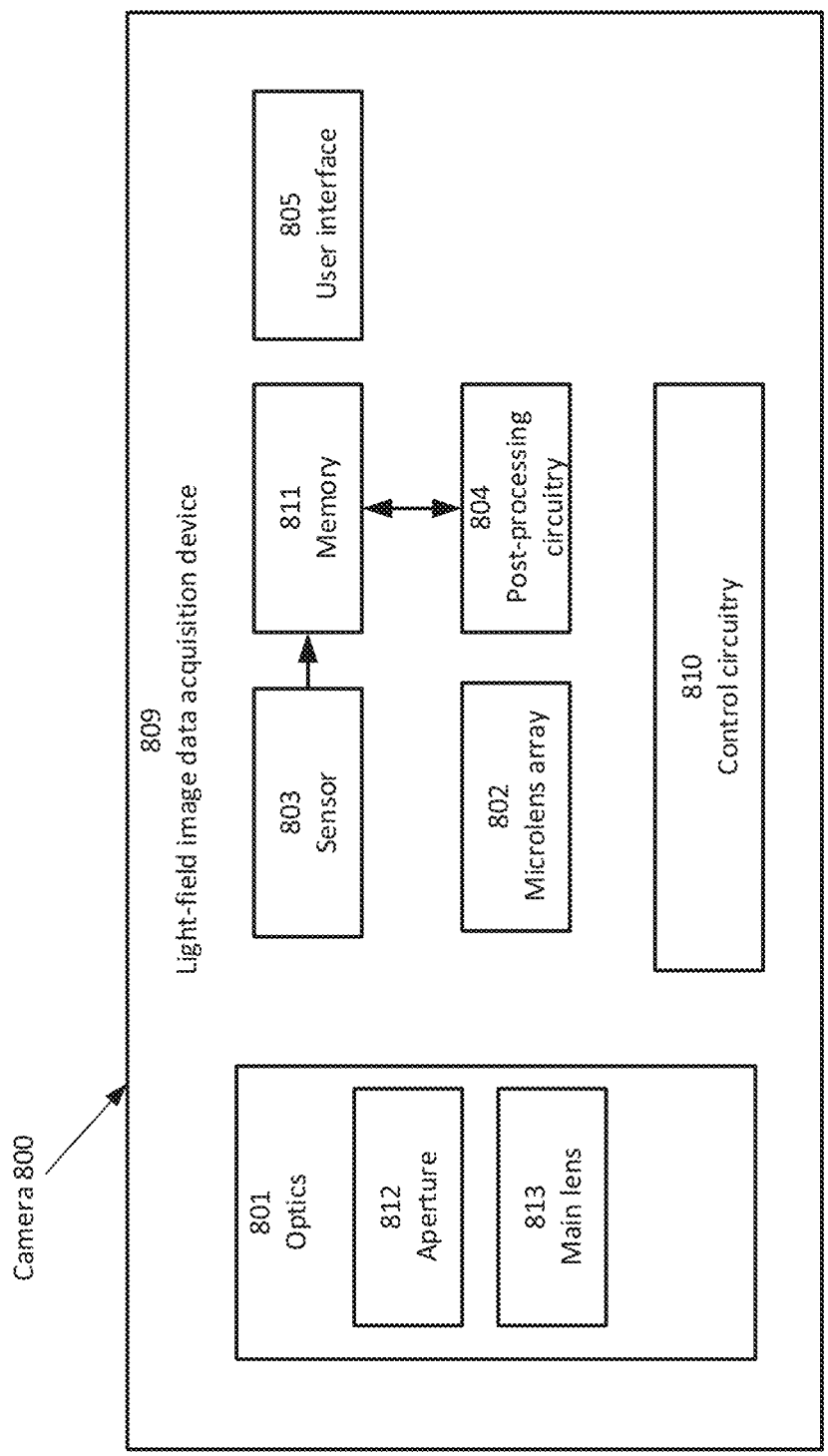
FIG. 2 depicts an example of an architecture for a light-field capture device, according to one embodiment.
Figure 3:
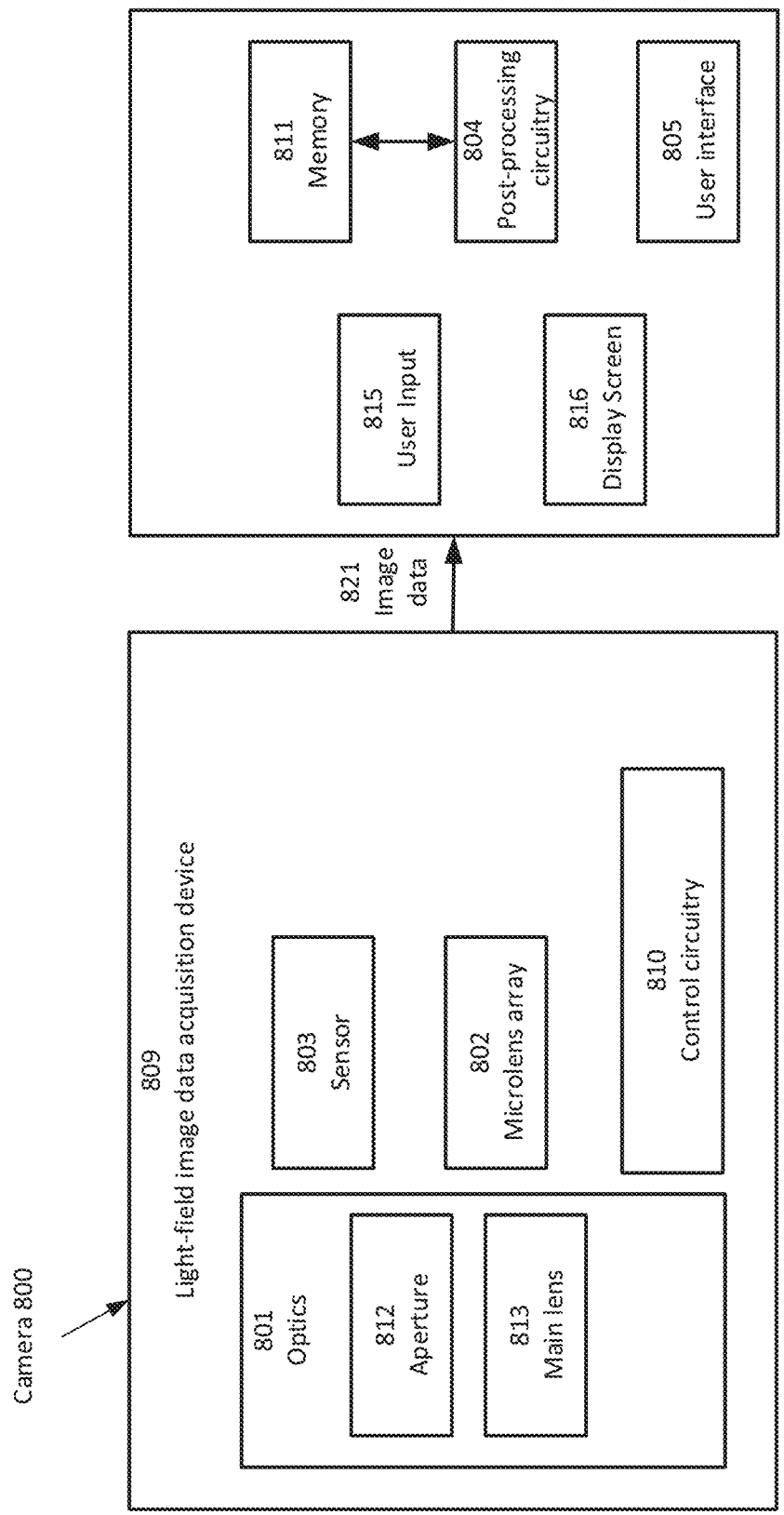
FIG. 3 depicts an example of an architecture for implementing post-processing in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting a light-field capture device such as a camera 800. Referring now also to FIG. 3, there is shown a block diagram depicting an architecture for implementing post-processing in a post-processing system communicatively coupled to a light-field capture device such as a camera 800, according to one embodiment. One skilled in the art will recognize that the particular configurations shown in FIGS. 2 and 3 are merely exemplary, and that other architectures are possible for camera 800. One skilled in the art will further recognize that several of the components shown in the configurations of FIGS. 2 and 3 are optional, and may be omitted or reconfigured.

Figure 4:
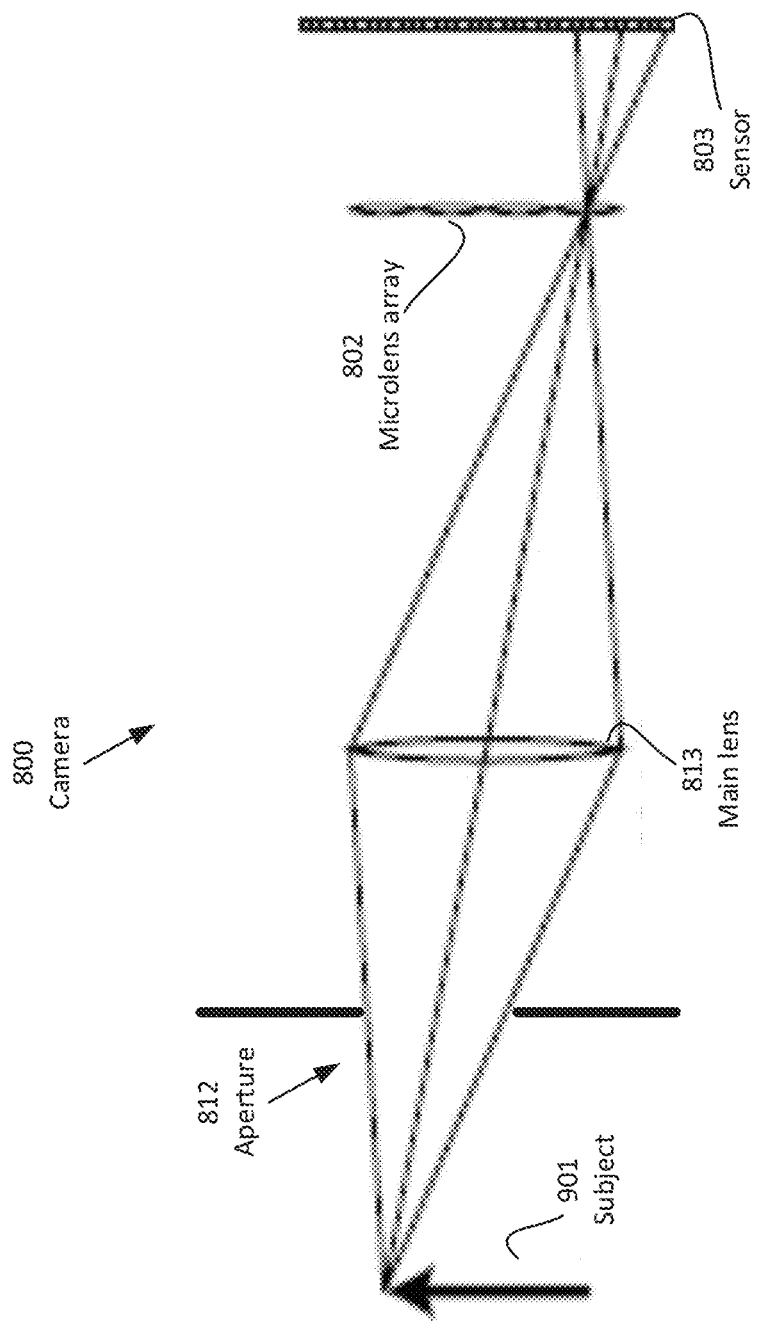
FIG. 4 depicts an example of an architecture for a light-field camera according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 4, there is shown an example of an architecture for a light-field camera 800 for implementing the method of the present disclosure according to one embodiment. The Figure is not shown to scale. FIG. 4 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 2, or it may be in a separate component external to light-field image data acquisition device 809, as shown in FIG. 3. Such separate component may be local or remote with respect to light-field image data acquisition device 809. Any suitable wired or wireless protocol can be used for transmitting image data 821 to circuitry 804; for example, camera 800 can transmit image data 821 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 815 and/or a display screen 816. If desired, light-field image data may be displayed for the user on the display screen 816.

Various aspects of the system and method of the present disclosure may be implemented on the camera 800 of FIG. 2 and/or on the post-processing system of FIG. 3. Alternatively or additionally, various aspects of the system and method can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 5:
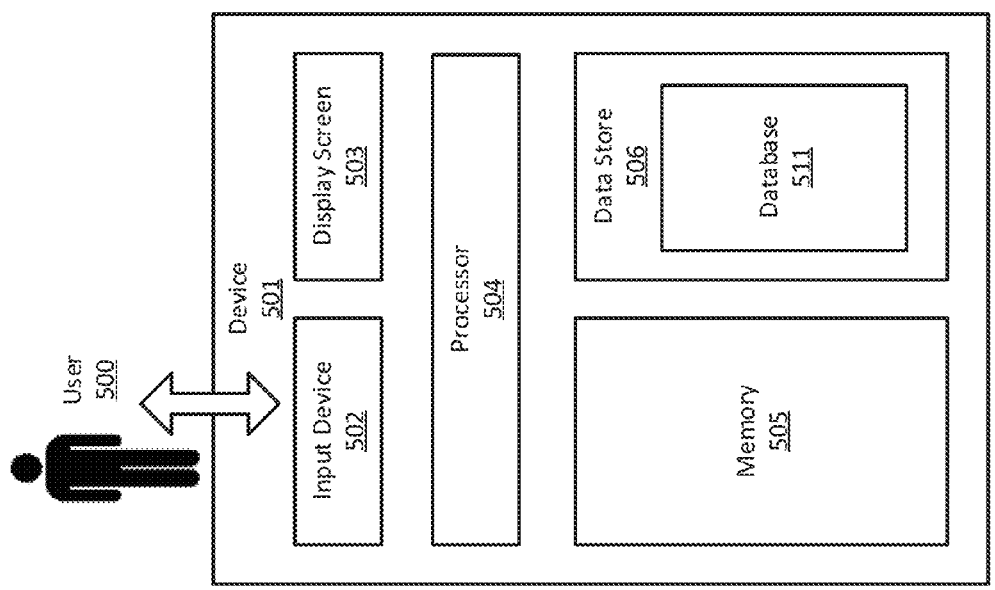
FIG. 5 is a block diagram depicting a hardware architecture for practicing the described method, according to one embodiment.

Referring to FIG. 5, there is shown a block diagram depicting a hardware architecture for practicing the described method, according to one embodiment. Such an architecture can be used, for example, for implementing the techniques of the system in a computer or other device 501. Device 501 may be any electronic device equipped to receive, store, and/or present information, and to receive user input in connect with such information.

In at least one embodiment, device 501 has a number of hardware components well known to those skilled in the art. Input device 502 can be any element that receives input from user 500, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 506 can be any magnetic, optical, or electronic storage device for data in digital form; examples include flash memory, magnetic hard drive, CD-ROM, DVD-ROM, or the like. In at least one embodiment, data store 506 stores information which may include one or more databases, referred to collectively as a database 511, that can be utilized and/or displayed according to the techniques described below. In another embodiment, database 511 can be stored elsewhere, and retrieved by device 501 when needed for presentation to user 500. Database 511 may include one or more data sets, which may be used for a variety of purposes and may include a wide variety of files, metadata, and/or other data.

Display screen 503 can be any element that graphically displays information such as items from database 511, and/or the results of steps performed on such items to provide information useful to a user. Such output may include, for example, raw data, data visualizations, illustrations of light-field camera components, light-field images, aberration correction metrics, and/or the like. Such information may be displayed by the display screen 503 in a wide variety of formats, including but not limited to lists, images, charts, graphs, and the like. In at least one embodiment where only some of the desired output is presented at a time, a dynamic control, such as a scrolling mechanism, may be available via input device 502 to change which information is currently displayed, and/or to alter the manner in which the information is displayed.

Processor 504 can be a conventional microprocessor for performing operations on data under the direction of software, according to well-known techniques. Memory 505 can be random-access memory, having a structure and architecture as are known in the art, for use by processor 504 in the course of running software.

Data store 506 can be local or remote with respect to the other components of device 501. In at least one embodiment, device 501 is configured to retrieve data from a remote data storage device when needed. Such communication between device 501 and other components can take place wirelessly, by Ethernet connection, via a computing network such as the Internet, via a cellular network, or by any other appropriate means. This communication with other electronic devices is provided as an example and is not necessary.

In at least one embodiment, data store 506 is detachable in the form of a CD-ROM, DVD, flash drive, USB hard drive, or the like. Database 511 can be entered from a source outside of device 501 into a data store 506 that is detachable, and later displayed after the data store 506 is connected to device 501. In another embodiment, data store 506 is fixed within device 501.

In one embodiment, the system of the present disclosure may be implemented as software written in any suitable computer programming language, whether in a standalone or client/server architecture. Alternatively, it may be implemented and/or embedded in hardware.

Figure 6:
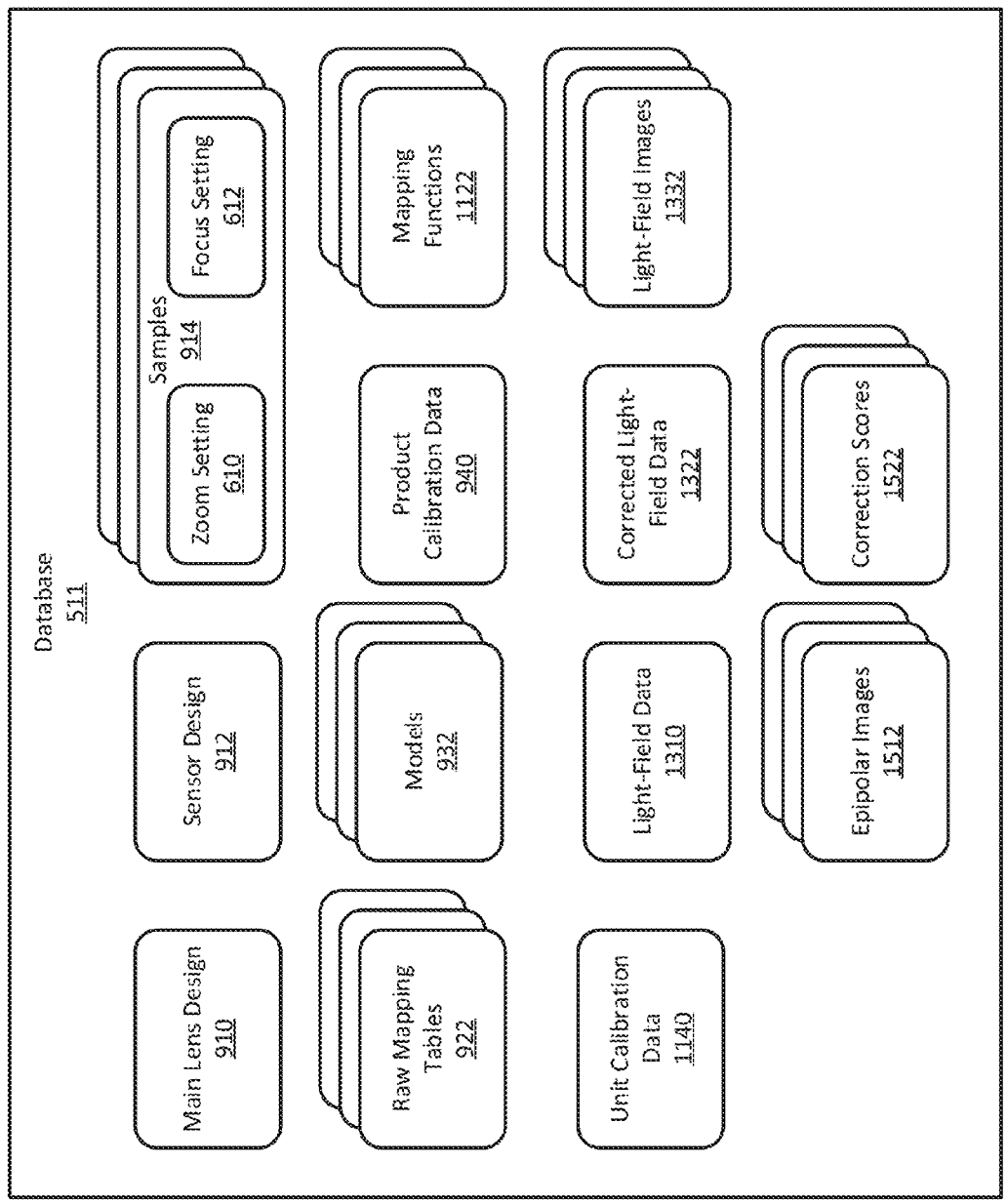
FIG. 6 is a schematic block diagram illustrating the database of FIG. 5, according to one embodiment.

Referring to FIG. 6, a schematic block diagram illustrates the database 511 of FIG. 5, according to one embodiment. The database 511 may include various data structures, examples of which are illustrated in FIG. 6.

More specifically, the database 511 may include, for example, a main lens design 910, a sensor design 912, one or more samples 914, one or more raw mapping tables 922, one or more models 932, product calibration data 940, one or more mapping functions 1122, unit calibration data 1140, light-field data 1310, corrected light-field data 1322, one or more light-field images 1332, one or more epipolar images 1512, and/or one or more correction scores 1522. These exemplary data structures will be described in greater detail as follows, and in conjunction with the subsequent description of the operation of the system and method of the present disclosure.

The main lens design 910 may include the details of the main lens 813 and/or related components (such as a microlens array 802, phase mask, and/or other optics) to be used in a series of light-field cameras 800. The main lens design 910 may include all of the information required to model the manner in which light travels through the light-field camera 800 to reach the image sensor 803. Accordingly, the main lens design 910 may include lens shapes, sizes, materials, and/or the like.

The sensor design 912 may include the details of the image sensor 803 and/or related components to be used in a series of light-field cameras 800. The sensor design 912 may include all of the information needed to model light-field data capture with the sensor design 912, when used in combination with the main lens design 910. Accordingly, the sensor design 912 may include the shape, size, light-receiving properties, and/or other information pertinent to the configuration and operation of the image sensor 803.

Each of the samples 914 may include one or more exemplary settings of the light-field camera 800, which may be user-adjustable settings. By way of example, the samples 914 may include a zoom setting 610 of the light-field camera 800, and a focus setting 612 of the light-field camera 800. Thus, each of the samples 914 may be a particular combination of settings, such as a particular zoom setting 610 and a particular focus setting 612.

Each raw mapping table 922 may be particular to one of the samples 914. Thus, there may be a raw mapping table 922 for each sample 914. Each of the raw mapping tables 922 may list multiple sensor locations on the sensor 803, and indicate the ideal light ray coordinates that correspond to each one of the sensor locations, for the sample 914 pertaining to the raw mapping table 922.

Each model 932 may be particular to one of the raw mapping tables 922, and thus to one of the samples 914. Thus, there may also be a model 932 for each sample 914. Each of the models 932 may provide a more compact way (such as a mathematical function or a more compact table that can be interpolated) to obtain the ideal light ray coordinates that correspond to each of the sensor locations, for the sample 914 to which the model 932 pertains.

The product calibration data 940 may be data that incorporates the raw mapping tables 922 and/or the models 932. The product calibration data 940 may be applied to light-field data to at least partially compensate for departure of the main lens design 910 and/or the sensor design 912 from ideal lenses and/or sensors. The product calibration data 940 may be product-specific, and may thus be applied to and/or utilized by all cameras 800 of a given design.

Each of the mapping functions 1122 may be particular to one of the samples 914. Thus, there may be a mapping function 1122 for each sample 914. Each of the mapping functions 1122 may list multiple sensor locations on the sensor 803, and indicate the non-ideal light ray coordinates that correspond to each one of the sensor locations, for the sample 914 pertaining to the raw mapping table 922.

The unit calibration data 1140 may be data that incorporates the mapping functions 1122. The unit calibration data 1140 may be applied to light-field data to at least partially compensate for departure of the actual main lens 813 and/or actual image sensor 803 in the field camera 800 to which it applies, from the main lens design 910 and/or the sensor design 912. The unit calibration data 1140 may be unit-specific, and may thus be applied to and/or utilized by only one individual camera 800. Each camera 800 of a given design may have its own unique unit calibration data 1140.

The light-field data 1310 may be data captured by the field camera 800. The light-field data 1310 may be raw data, or may have been subjected to one or more preliminary processing steps, such as demodulation, demosaicing, auto-white balancing, saturation recovery, and/or the like.

The corrected light-field data 1322 may be the data that results from application of the product calibration data 940 and/or the unit calibration data 1140. Thus, the corrected light-field data 1322 may at least partially compensate for departure of the main lens design 910 and/or the sensor design 912 from ideal lenses and/or sensors. Additionally or alternatively, the corrected light-field data 1322 may at least partially compensate for departure of the actual main lens 813 and/or actual image sensor 803 in the field camera 800 to which it applies, from the main lens design 910 and/or the sensor design 912.

The light-field images 1332 may be images created from light-field data, such as the light-field data 1310 and/or the corrected light-field data 1322. The light-field image 1332 may be two-dimensional representations of the corresponding light-field data.

The epipolar images 1512 may be unique light-field images generated for testing purposes. Generally, an epipolar image may be a two-dimensional slice of a four-dimensional light-field given one fixed image and one set of fixed aperture coordinates. Exemplary epipolar images 1512 will be shown and described subsequently.

The correction scores 1522 may be scores indicative of how well the corrected light-field data 1322 has successfully corrected the light-field data 1310. Thus, the correction score 1522 may indicate how well the corrected light-field data 1322 compensates for departure of the main lens design 910 and/or the sensor design 912 from ideal lenses and/or sensors. Additionally or alternatively, the correction score 1522 may indicate how well the corrected light-field data 1322 compensates for departure of the actual main lens 813 and/or actual image sensor 803 in the field camera 800 to which it applies, from the main lens design 910 and/or the sensor design 912.

Light-Field Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x, y, u, v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing" filed Feb. 22, 2013, the disclosure of which is incorporated herein by reference.

Basics of Aberration

Light-field

Mathematically, a light-field is a 4D representation of light rays traveling in free space. In general 3D free space, each light ray can be identified by its intersection with two 2D coordinate planes. In a light-field camera, one plane is typically aligned with the aperture plane, and the other plane is aligned with the microlens array (this is referred to as the image plane).

Figure 7:
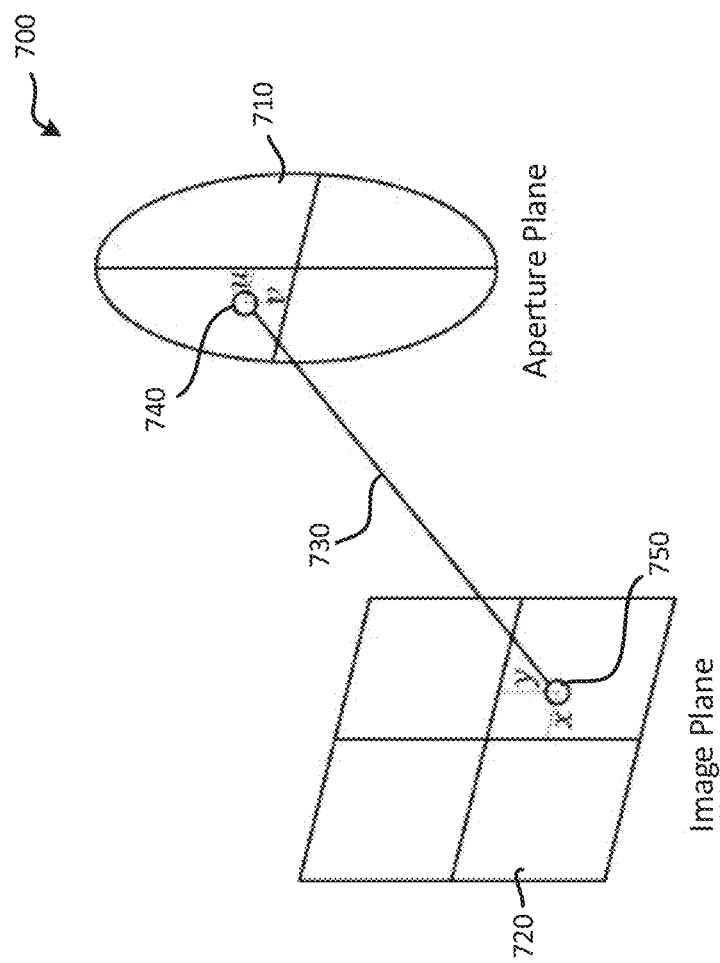
FIG. 7 is an isometric view of a portion of a light-field camera.

In the following description, (x, y) denotes the spatial coordinates on the microlens array, and (u, v) denotes the angular coordinates on the aperture plane. One example is shown in FIG. 7. More specifically, FIG. 7 is an isometric view of a portion of a light-field camera 700 with an aperture plane 710 and an image plane 720. A light ray 730 is shown passing from the aperture plane 710 to the image plane 720. At the aperture plane 710, the light ray 730 passes through (u, v) coordinates 740, and at the image plane 720, the light ray 730 passes through (x, y) coordinates 750.

A light-field camera records the information of individual light rays (or ray bundles), each representing a sample of a four-dimensional dataset (color, brightness, polarization, and the like). Such a technique enables many novel applications, such as digital refocusing, range sensing, and perspective shift.

In the system described herein, the light-field includes light-field data captured by the light-field camera and associated metadata (exposure, gain, time, etc.). The light-field data is a 2D array, which is read out from the CCD or CMOS sensor array. Therefore, each sample in the data can be indexed by 2D coordinates (s, t).

Aberration

In a perfect thin-lens optical system, light rays emitted from a point source through the lens would converge again to a point on the image plane. However, real lenses deviate from such an ideal thin lens due to physical constraints; this deviation is referred to as aberration. Aberration causes distortions to the resulting image. Different types of distortion may take place, including for example defocus, field curvature, spherical distortion, astigmatism, coma, and/or the like. In practice, the magnitude and nature of the aberration depends on, for example, the optical design, lens configuration, wavelength, and manufacture process.

Aberration means that after a light ray passes through the lens, it does not travel along the path predicted by the ideal thin lens model. Therefore, the 4D coordinates of that light ray are different from the ideal coordinates. The deviation is unique to each light ray, and can be described as a mapping function from ideal coordinates (x', y', u', v') to non-ideal coordinates (x, y, u, v):

$$(x, y, u, v) = f(x', y', u', v', \lambda, P)$$

where $\lambda$ is the wavelength, and P includes all other configurable parameters of the system.

Aberration Correction

In practice, it is useful to convert the non-ideal coordinates recorded by the light-field camera to ideal coordinates. If this is done, the recorded 4D samples can be treated as they were taken with the ideal optical system, allowing the system to correct all distortion caused by aberration. Therefore, the reverse mapping function is of interest:

$$(x', y', u', v') = b(x, y, u, v, \lambda, P)$$

After the correction is done, regular light-field processing can be performed on the image data by replacing the original, non-ideal coordinates with the corrected, ideal, coordinates. This can be done in post-processing, either by software or hardware or a combination of the two.

The following is an example of a procedure that can be used to find the mapping between the actual and ideal lens systems. What the camera physically records is termed the aberrated ray space, denoted by coordinates (x', y', u', v'); these coordinates can be unambiguously remapped into an ideal ray space (x, y, u, v). The mapping between these two spaces can be computed by knowing the design of the lens and tracing rays outward from the center of each pixel on the sensor.

Figure 8:
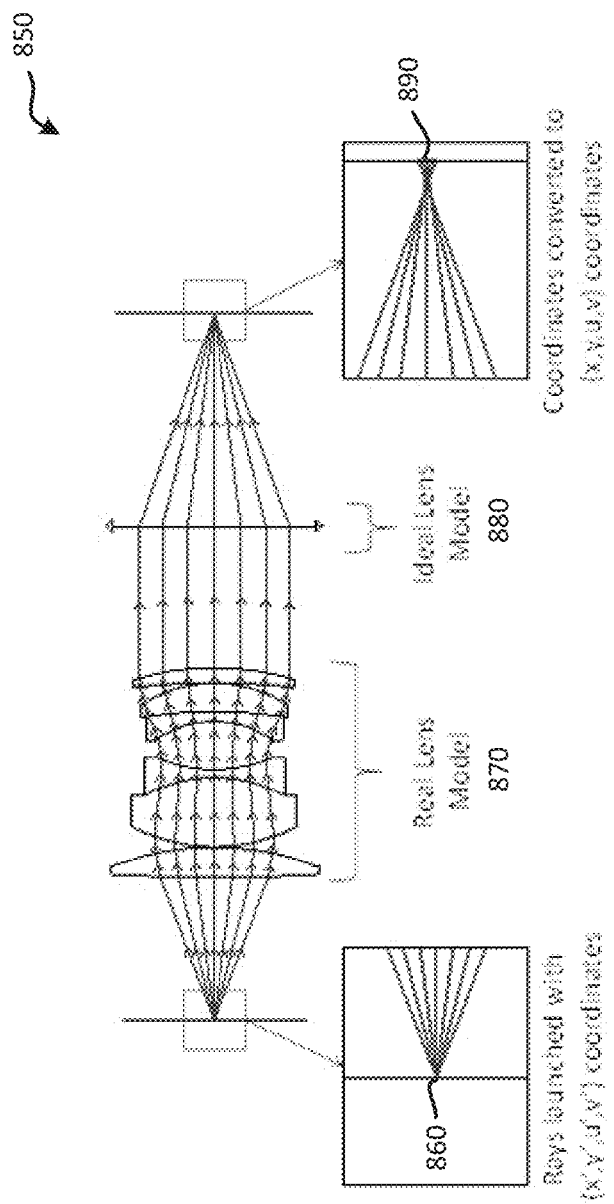
FIG. 8 is a diagram illustrating an example of mapping coordinates between real and idealized lens systems.

An example of mapping coordinates between real and idealized lens systems is illustrated in diagram 850 of FIG. 8, with reference to the center pixel. The rays are launched at an origin 860. The rays are traced through all of the elements of the real lens 870 into the real world. The rays are then traced through a corresponding ideal model of the ideal lens 880. The rays terminate at a terminus 890 on a sensor plane, and the rays' 4D coordinates are recorded. The difference between the 4D coordinate the ray was launched with (i.e., at the origin 860) and the 4D coordinate it terminates at (i.e., at the terminus 890) is the correction vector for that specific pixel. This process defines what is called the ray correction function.

Such mappings may be used in the process of aberration correction. In some embodiments, aberration correction may include multiple stages. For example, product calibration data, such as the product calibration data 940, may be obtained for all cameras 800 with a given design. Unit calibration data, such as the unit calibration data 1140, may be obtained for each individual camera 800. Then, the product calibration data 940 and the unit calibration data 1140 may be used to process the light-field data 1310 to correct the effects of aberration, thereby generating the corrected light-field data 1322. These exemplary stages will be shown and described in greater detail, as follows.

Product Calibration Data Generation

Light-field processing benefits from per-product calibration information for correctly interpreting the incoming data captured by the product, wherein a product is a particular model or design of a light-field capture device. For aberration correction, the reverse mapping function b can be used.

As described above, the mapping function is determined by the optical design and lens configuration during operation. The lens configurations may include zoom and focus adjustments, as well as other characteristics. Therefore, one example of the configuration parameters is P={zoom, focus}, although other characteristics can be included. The mapping function may be seven-dimensional, or may contain more or fewer dimensions. At any rate, given all the different permutations, generating and storing all possible mapping function can be highly impractical.

In at least one embodiment, the system addresses this problem by using a two-stage process. In at least one embodiment, this process is only performed once for each product (or each lens design).

Figure 9:
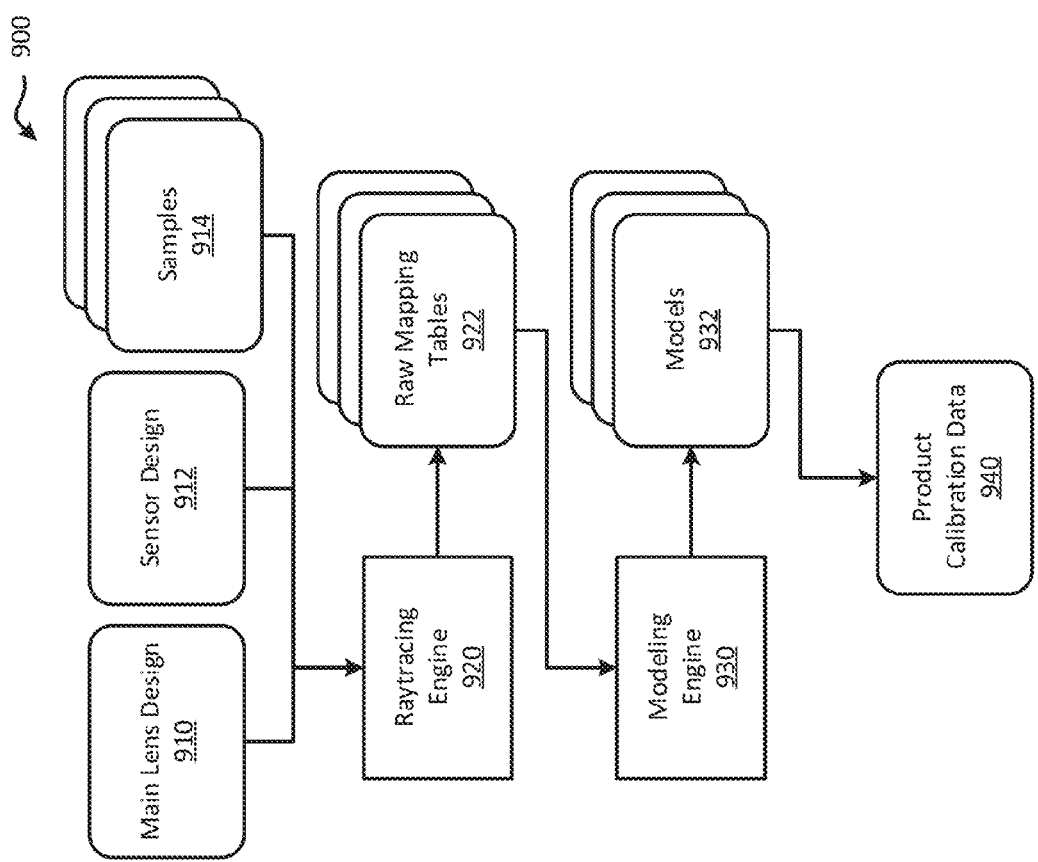
FIG. 9 is a schematic block diagram illustrating a system for generating the product calibration data according to one embodiment.

FIG. 9 is a schematic block diagram illustrating a system 900 for generating the product calibration data 940 according to one embodiment. The system 900 may include any computing device; in some embodiments, the system 900 may reside on a computing device such as the device 501 of FIG. 5.

As shown, the system 900 may have a raytracing engine 920 and a modeling engine 930. The main lens design 910, the sensor design 912, and the samples 914 may be used by the raytracing engine 290 as inputs for an optical simulation process such as raytracing. Based on results of the raytracing procedure, the raytracing engine 920 may generate the raw mapping tables 922. As mentioned previously, the raw mapping tables 922 may be specific to individual samples 914. Thus, a raw mapping table 922 may be generated for each sample 914.

In some cases, the raw mapping tables 922 may, collectively, be too large to be used in raw form. Thus, in at least one embodiment, they may advantageously be compressed and/or otherwise approximated to facilitate application to the light-field data 1310. Hence, the raw mapping tables 922 may be received by the modeling engine 930. The modeling engine 930 may perform one or more modeling procedures on the raw mapping tables 922 to mathematically approximate and/or compress the raw mapping tables 922. The modeling engine 930 may provide the models 932.

The product calibration data 940 may be obtained using the models 932. If desired, the product calibration data 940 may include the models 932, indexed by the sample 914 to which they pertain. The manner in which the raytracing engine 920 and the modeling engine 930 operate will be disclosed in greater detail in connection with FIG. 10.

Figure 10:
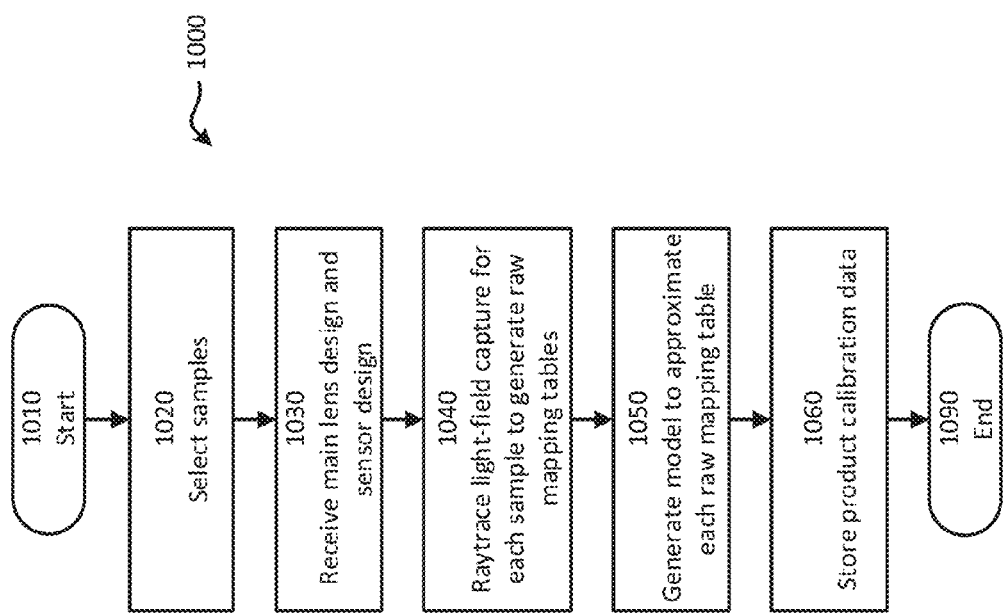
FIG. 10 is a flow diagram illustrating a method of using the system of FIG. 9 to generate the product calibration data.

FIG. 10 is a flow diagram illustrating a method 1000 of using the system 900 of FIG. 9 to generate the product calibration data 940. The method 1000 may start 1010 with a step 1020 in which the samples 914 are selected. The samples 914 may be selected at random, by a user, and/or in a manner that conforms to a matrix of evenly-spaced or otherwise distributed settings for the camera 800. Once the samples 914 have been selected, the system 900 may, in a step 1030, receive the main lens design 910 and the sensor design 912. Then, Algorithm I may be performed, as follows:

Algorithm I: Per-Product Calibration Data Generation
Input: Main lens design 910, sensor design 912, all {zoom, focus} samples (i.e., the samples 914).
Output: Compact reverse mapping model (the models 932) for each {zoom, focus} sample
1. In a step 1040, Raytracing: For each {zoom, focus} sample:
   a. Construct the full light-field camera optical system
   b. Set a flat virtual target chart at a fixed distance
   c. Estimate the equivalent ideal lens model, including the focal length and lens-sensor distance.
   d. For each sensor (s, t) (i.e., each sensor location):
      i. Trace a number of rays {i} through the camera to hit the target chart, record the intersection location $(x_{t,i}, y_{t,i})$ and incident angle $(u_{t,i}, v_{t,i})$.
      ii. Trace each ray back the target through the ideal thin lens model to hit the lens and the sensor. Record the aperture intersection coordinates $(u'_i, v'_i)$ and the sensor intersection coordinates $(x'_i, y'_i)$.
      iii. Average all $(x'_i, y'_i, u'_i, v'_i)$ into $(x', y', u', v')$
      iv. Save raw mapping table $r(s, t)=(x', y', u', v')$
2. In a step 1050, Modeling: For each raw mapping table $r_{\{zoom, focus\}}$:
   a. Estimate the model parameters from $r_{\{zoom, focus\}}$.
   b. Save the model parameters In at least one embodiment, Algorithm I contains two main stages: raytracing (the step 1040) and modeling (the step 1050). Each of these is described in more detail below.

Raytracing

The goal of step 1040 is to find accurate ideal 4D coordinates for each of the sensor locations on the image sensor 803. In at least one embodiment, the system 900 and method 1000 achieve this goal using an improved raytracing software engine, which may be part of the raytracing engine 920.

In at least one embodiment, the raytracing engine 920 first constructs the optical system to be analyzed given the main lens design 910, the sensor design 912, and the current {zoom, focus} setting (the current sample 914). The main lens design 910 may include various lens surface properties (such as, for example, reflective indices for each wavelength, surface profiles, inter-surface distances, and the like). The sensor design 912 may include properties such as wavelength sensitivity, angular sensitivity, sensor area, inter-sensor spacing, and the like. In at least one embodiment, a virtual target chart can be specified to be used as a reference object for backward tracing, as described below.

As indicated in step 1.c. of Algorithm I, in one embodiment, the raytracing engine 920 estimates the (approximately) equivalent ideal, thin-lens, optical system from the design prescriptions and settings. The ideal system includes, for example, at least two parameters: the focal length and the lens-sensor distance. The first parameter may be estimated by tracing many parallel rays from infinity (in the world) toward the given lens system (into the camera), and finding the distance with minimal spatial coverage of the refracted rays. The second parameter may be estimated by first tracing many rays from a sensor point through the given lens system, finding the distance with minimal spatial coverage of the refracted rays, and then calculating the ideal image distance using a simple thin lens equation.

The raytracing engine 920 may then perform a regular raytracing operation for each sensor. The raytracing engine 920 may shoot many rays from the sensor toward the world through the optical system and calculate the intersection with the target chart. As indicated in step 1.i d.i of Algorithm I, in one embodiment, the raytracing engine 920 may record the spatial intersection coordinates and incident angle for each ray.

The raytracing engine 920 may then trace each ray backward from the chart through the ideal optical system to reach the image plane, and record the 4D light-field coordinates (as indicated in step 1.d.ii of Algorithm I). In at least one embodiment, in order to reduce the noise in numerical simulation, the system averages all coordinates together (step 1.d.iii in Algorithm I).

The output of stage one is a set of high-resolution, raw, mapping tables (the raw mapping tables 922) that map each sensor (s, t) location to the ideal 4D coordinates (x', y', u', v') for each {zoom, focus} sample 914. Note that the mapping from (s, t) to (x, y, u, v) is straightforward in the ideal simulation environment and is therefore omitted in this description. Unfortunately, the amount of data can be easily up to tens of gigabytes, making it different to transfer, load, or maintain. For example, for a 20-megapixel camera with 100 zoom and 100 focus settings, if each set of coordinates are stored using 4 floating point numbers, the amount of data for the correction table would be approximately 2.9 terabytes.

Modeling

In at least one embodiment, in order to reduce the amount of data, the system 900 converts the raw mapping tables 922 to a more compact representation based on modeling. This may be done by the modeling engine 930. As long as the error introduced by the modeling is small enough, the correction result is perceptually identical.

One skilled in the art will recognize that there are many ways to model the raw mapping tables 922. Two examples are provided herein; however, any suitable data modeling techniques can be used.

The first approach uses the polynomial fitting:

$$b(x, y, u, v) \cong \sum_{i=1}^{K_x} \sum_{j=1}^{K_y} \sum_{k=1}^{K_u} \sum_{l=1}^{K_v} \alpha_{i,j,k,l} x^i \beta_{i,j,k,l} y^j \gamma_{i,j,k,l} u^k \delta_{i,j,k,l} v^l,$$

where $\{\alpha_{i,j,k,l}, \beta_{i,j,k,l}, \gamma_{i,j,k,l}, \delta_{i,j,k,l}\}$ are the polynomial coefficients. The value of those coefficients can be estimated by minimizing the following energy function:

$$\sum_s \sum_t \left\| \sum_{i=1}^{K_x} \sum_{j=1}^{K_y} \sum_{k=1}^{K_u} \sum_{l=1}^{K_v} \alpha_{i,j,k,l} x^i \beta_{i,j,k,l} y^j \gamma_{i,j,k,l} u^k \delta_{i,j,k,l} v^l - r(s, t) \right\|,$$

which can be easily done by using most optimization software packages. This fitting reduces the data size from full sensor resolution to $4K_x K_y K_u K_v$ for each {zoom, focus} sample.

The second approach assumes that each raw mapping table 922 is smooth and can represented by a low-resolution 4D table T, and the ideal 4D coordinates can be approximated by:

$$b(x, y, u, v) = \sum_{i=1}^{R_x} \sum_{j=1}^{R_y} \sum_{k=1}^{R_u} \sum_{l=1}^{R_v} W(x, y, u, v, i, j, k, l) T[i, j, k, l]$$

where the table resolution is $R_x \times R_y \times R_u \times R_v$, which is usually much smaller than the full sensor resolution. T[i, j, k, l] refers one four-value entry in the table indexed by discrete indices [i, j, k, l], and W is the weighting coefficient representing the importance of each entry in interpolating the output values.

The table can be generated by resampling and averaging the high-resolution table, and the weighting function can be decomposed into a few separated one-dimensional functions:

$$W(x, y, u, v, i, j, k, l) = W(x, i) W(y, j) W(u, k) W(v, l),$$

where each one can be a simple bi-linear kernel. For example, $$W(x, i) = \max(1 - |x - S_x(i)|, 0),$$

where $S_x(i)$ maps the table index i to the spatial coordinates. The formulas for the other three functions are similar. More complex interpolation functions, such as cubic or Lanczos, can be used here in addition to or in the alternative to the foregoing.

In at least one embodiment, once modeling is complete, model parameters are saved in binary form for storage and transfer. These model parameters may be stored in the product calibration data 940 in a step 1060. Besides the modeling technique described above, further data size reductions can be achieved by the use of well-known lossy or lossless compression techniques, such as quantization, LZW, or entropy coding. The method 1000 may then end 1090.

Figure 11:
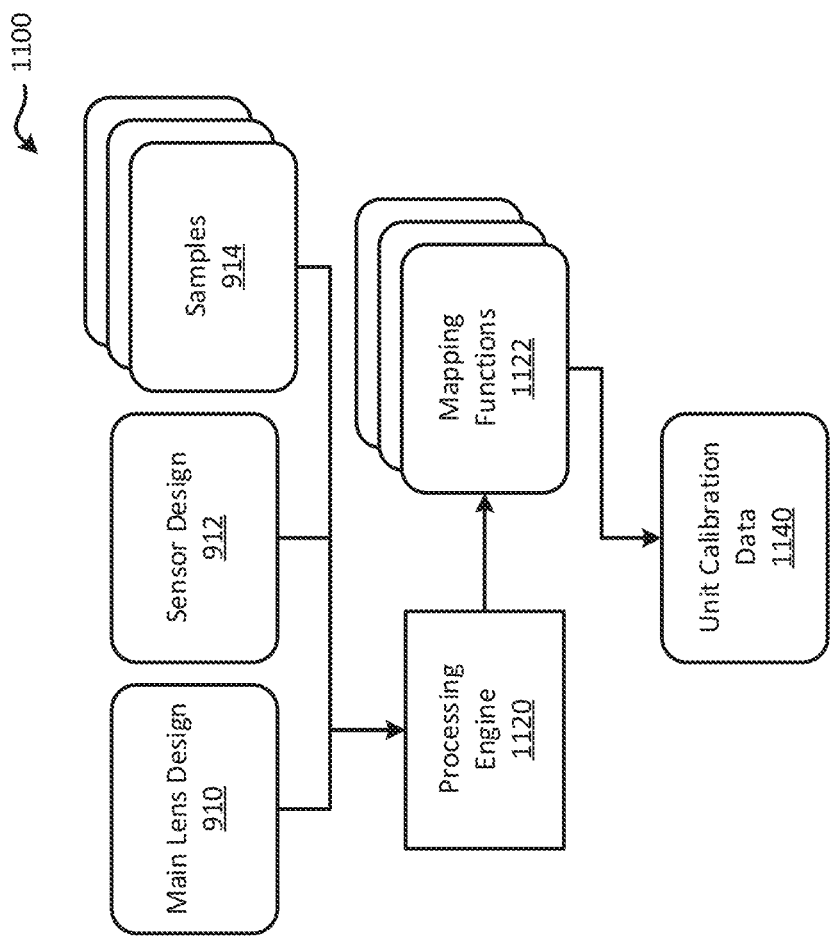
FIG. 11 is a schematic block diagram illustrating a system for generating the unit calibration data according to one embodiment.

Per-Unit Calibration Data Generation:

Besides the per-production calibration, which calibrates based on a particular model or design of the product, at least one embodiment of the present disclosure also calibrates each unit (for example, each individual camera 800) to characterize the unit variation due to material and manufacture errors. FIG. 11 is a schematic block diagram that illustrates a system 1100 for generating the unit calibration data 1140 according to one embodiment. The system 1100 may include any computing device; in some embodiments, the system 1100 may reside on a computing device such as the device 501 of FIG. 5.

As shown, the system 1100 may include a processing engine 1120. The processing engine 1120 may receive the main lens design 910, the sensor design 912, and/or the samples 914, and may process them to generate the mapping functions 1122. As mentioned previously, the mapping functions 1122 may be specific to individual samples 914. Thus, a mapping function 1122 may be generated for each sample 914.

The unit calibration data 1140 may be obtained using the mapping functions 1122. If desired, the unit calibration data 1140 may include the mapping functions 1122, indexed by the sample 914 to which they pertain. The manner in which the processing engine 1120 operates will be disclosed in greater detail in connection with FIG. 12.

Figure 12:
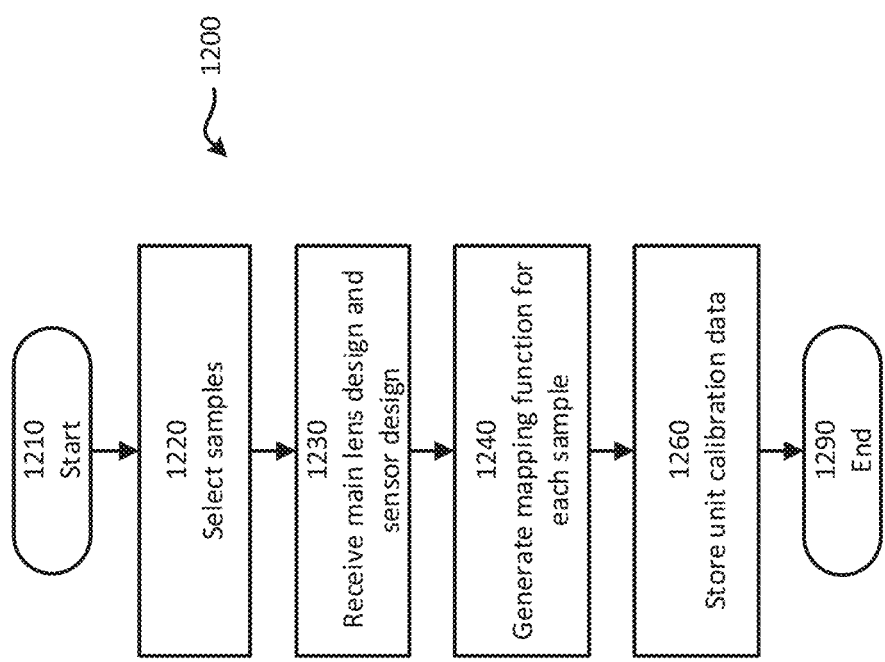
FIG. 12 is a flow diagram illustrating a method of using the system of FIG. 11 to generate the unit calibration data.

FIG. 12 is a flow diagram illustrating a method 1200 of using the system 1100 of FIG. 11 to generate the unit calibration data 1140. The method 1200 may start 1210 with a step 1220 in which the samples 914 are selected. The samples 914 may be selected at random, by a user, and/or in a manner that conforms to a matrix of evenly-spaced or otherwise distributed settings for the camera 800. Additionally or alternatively, the samples 914 may be the same as those used in conjunction with the method 1000 for obtaining the product calibration data 940. The method 1000 and the method 1200 need not be performed in any particular order relative to each other; rather, either may be performed before the other.

Once the samples 914 have been selected, the system 1100 may, in a step 1230, receive the main lens design 910 and the sensor design 912. Then, the processing engine 1120 may, in a step 1240, generate the mapping function 1122 for each sample 914, as follows.

For aberration correction, the system 1100 may use the mapping function g for mapping each set of sensor coordinates (s, t) to a set of non-ideal 4D coordinates (x, y, u, v):
(x, y, u, v) = g(s, t)

Each mapping function 1122 can includes any of a number of parameters, including the global translation and rotation between the microlens array 802 and the image sensor 803, the distortion of the microlens array 802, the local distortion individual microlenses of the microlens array 802, and/or other variations due to manufacture. Mechanisms for representing and estimating g are described in related U.S. Utility application Ser. No. 13/774,971, for "Compensating for Variation in Microlens Position During Light-Field Image Processing", filed Feb. 22, 2013, the disclosure of which is incorporated herein by reference in its entirety. In at least one embodiment, the unit calibration data 1140 also uses the main lens design 910; thus, it may use one mapping function 1122 for each {zoom, focus}, i.e., each sample 914.

Once the mapping functions 1122 have been obtained for all of the samples 914, the mapping functions may be stored in the unit calibration data 1140 in a step 1260. The method 1200 may then end 1290.

Figure 13:
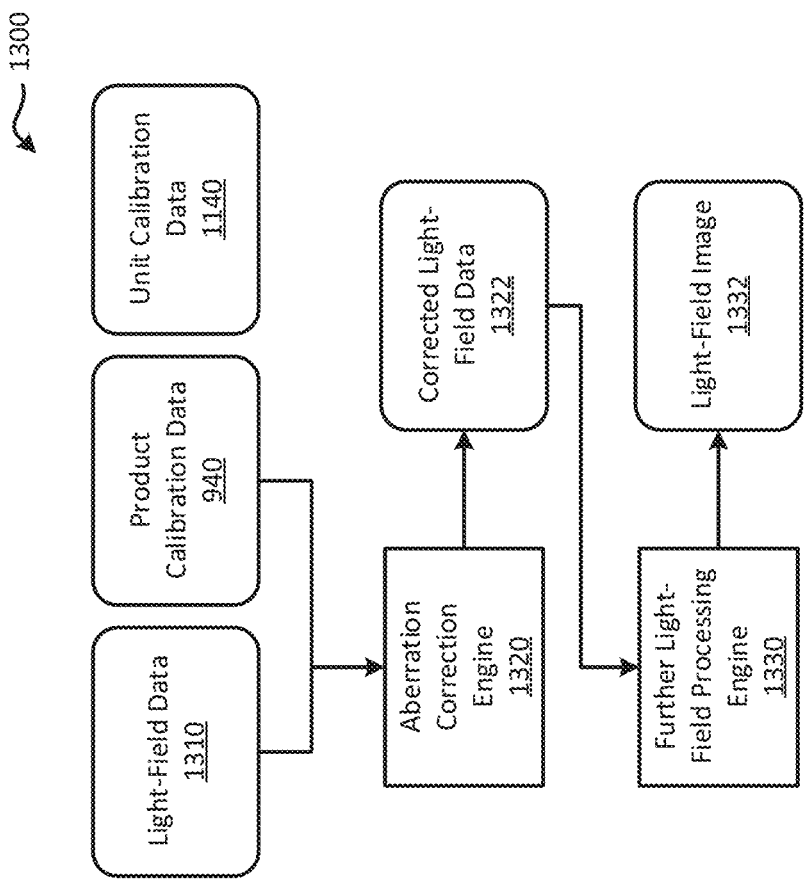
FIG. 13 is a schematic block diagram illustrating a system for correcting light-field data and/or conducting generalized subsequent processing, according to one embodiment.

Light-Field Image Correction:

After the product calibration data 940 and the unit calibration data 1140 have been obtained, various stages in the light-field processing system can be upgraded to become "aberration-aware" and generate better results. FIG. 13 is a schematic block diagram that illustrates a system 1300 for correcting light-field data, such as the light-field data 1310 and/or conducting generalized subsequent processing, according to one embodiment. The system 1300 may include any computing device; in some embodiments, the system 1100 may reside on a computing device such as the device 501 of FIG. 5. Alternatively or additionally, the system 1300 may reside on a camera 800 such as that of FIG. 2 or a post-processing device connected to a camera 800 such as that of FIG. 3.

As shown, the system 1300 may include an aberration correction engine 1320 and a further light-field processing engine 1330. The aberration correction engine 1320 may receive the light-field data 1310, the product calibration data 940, and/or the unit calibration data 1140, and may process them to generate the corrected light-field data 1322, which has been corrected to remove and/or reduce the effects of aberrations.

More specifically, generation of the corrected light-field data 1322 by the aberration correction engine 1320 may include applying the product calibration data 940 to correct the light-field data 1310 to remove and/or reduce the effects of design departures, which are departures of the main lens design 910 and/or the sensor design 912 of a camera design from their ideal counterparts. Additionally or alternatively, generation of the corrected light-field data 1322 by the aberration correction engine 1320 may include applying the unit calibration data 1140 to correct the light-field data 1310 to remove and/or reduce the effects of manufacturing departures, which are departures of the actual main lens 813 and/or image sensor 803 of a particular camera 800 from the main lens design 910 and/or the sensor design 912 intended to be produced in that camera 800.

The further light-field processing engine 1330 may conduct one or more additional processing steps to create one or more light-field images 1332 from the light-field data 1322. Optionally, the further light-field processing engine 1330 may conduct additional processing steps to enhance and/or otherwise modify the resulting light-field images 1332. For example, the further light-field processing engine 1330 may perform functions that include, but are not limited to, modulation, demodulation, demosaicing, auto-white balancing, saturation recovery, and the like. The operation of the aberration correction engine 1320 and the further light-field processing engine 1330 will be described in greater detail in connection with FIG. 14.

Figure 14:
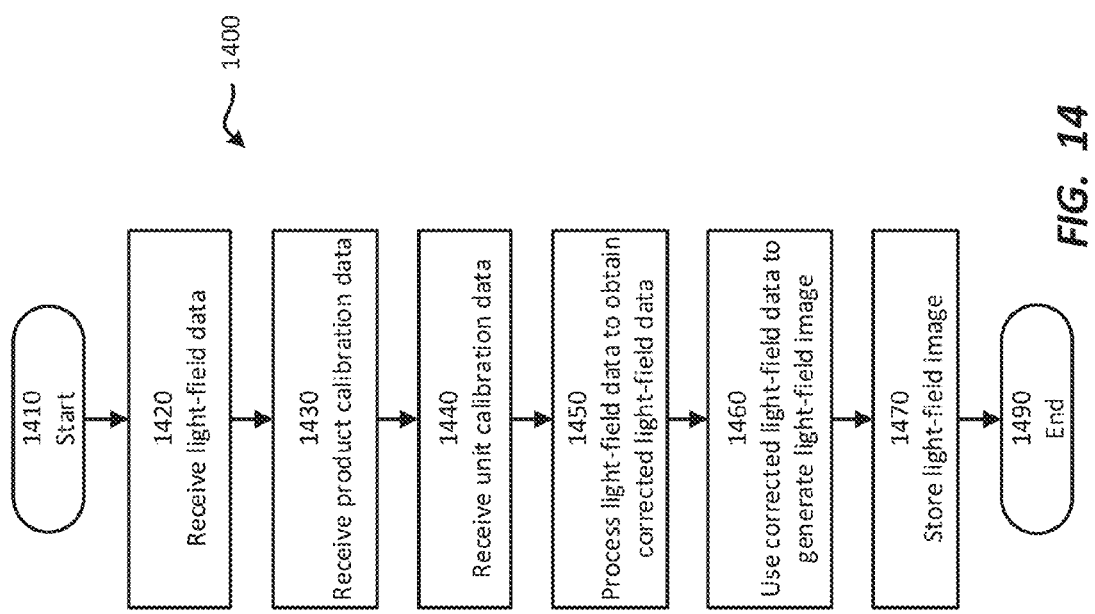
FIG. 14 is a flow diagram illustrating a method of using the system of FIG. 13 to generate one or more light-field images.

FIG. 14 is a flow diagram illustrating a method 1400 of using the system 1300 of FIG. 13 to generate one or more light-field images 1332. The method 1400 may optionally be performed after performance of the method 1000 of FIG. 10 and the method 1200 of FIG. 12 so that the method 1400 can utilize the product calibration data 940 and the unit calibration data 1140.

The method 1400 may start 1410 with a step 1420 in which the light-field data 1310 is received. The light-field data 1310 may, for example, be received from the image sensor 803 of the camera 800. Then, in a step 1430, the product calibration data 940 may be received, and in a step 1440, the unit calibration data 1140 may be received. In a step 1450, the aberration correction engine 1320 may correct the light-field data 1310 to produce the corrected light-field data 1322. A generalized version of the step 1450 can be described as follows:

Algorithm II: Generic Light-Field Processing with Aberration Correction

Input: Light-field data 1310 and associated metadata, unit calibration data 1140, and product calibration data 940

Output: Corrected light-field data 1322 and associated metadata

1. Use the lens configuration in the input metadata to construct the reverse mapping function b.
2. Use the input metadata to construct the per-unit mapping function g.
3. For each query of sample (s, t):
   a. Compute (x, y, u, v)=g(s, t).
   b. Compute (x', y', u', v')=b(x, y, u, v). This may complete generation of the corrected light-field data 1322.
   c. Use (x', y', u', v') as the 4D coordinates in the following processing. The previous steps may complete the step 1450; accordingly, this step 1.c. may constitute performance of the step 1460.

In creating the reverse mapping function $^b$ (1. in Algorithm II), the most straightforward is to check the {zoom, focus} in the metadata for the light-field data 1310, and find the portion of the product calibration data 940 with most similar {zoom, focus} value. This may entail locating, within the product calibration data 940, the model 932 that corresponds to the {zoom, focus} value. Additionally or alternatively, one or more advanced techniques can be applied, such as fusing a few tables with similar {zoom, focus} values by weighted interpolation.

After the mapping functions b and g have been created, the corrected light-field data 1322 may be used to generate one or more light-field images 1332 in the step 1460. This may entail performing regular light-field processing. Accordingly, the further light-field processing engine 1330 may utilize a conventional light-field processing algorithm, except that the non-ideal four-dimensional coordinates from the light-field data 1310 may be replaced with ideal coordinates from the corrected light-field data 1322, (obtained in step 3.b. in Algorithm II).

Algorithm II may include any light-field processing stages or applications, including but not limited to digital refocusing, EDOF projection, and general projection, as described in related U.S. Utility application Ser. No. 13/688,026, for "Extended Depth of Field and Variable Center of Perspective in Light-Field Processing", filed Nov. 28, 2012, the disclosure of which is incorporated herein by reference in its entirety. Additionally or alternatively, Algorithm II may include additional light-field processing operations, such as light-field filtering, denoising, light-field resampling, light-field compression, the aberration correction quality assessment (as described below), and the like. Once all desired processing steps have been completed, in a step 1470, the one or more light-field images 1332 may be stored, for example in the data store 506, and the method may end 1490.

If desired, the correction can be easily disabled by setting the reverse table to pass the input as output. That is, (x, y, u, v)=b(x, y, u, v).

Optional: Aberration Correction Quality Assessment

Figure 15:
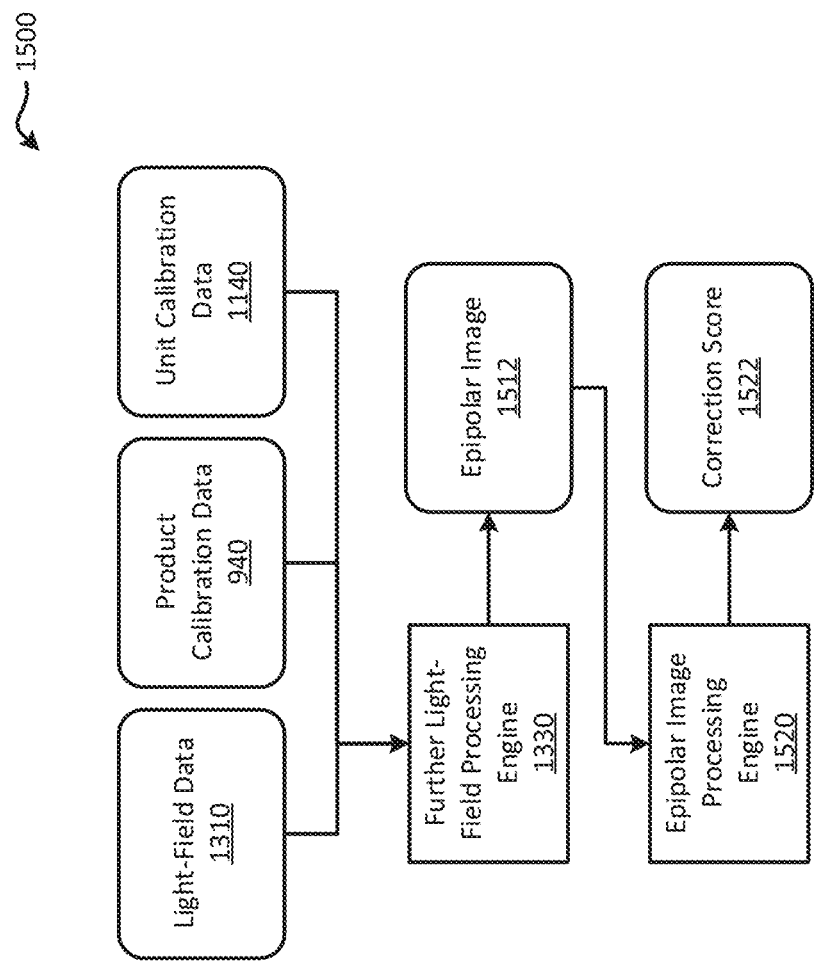
FIG. 15 is a schematic block diagram illustrating a system for assessing the quality of aberration correction.

In addition to the systems and methods described above, in at least one embodiment, a determination is made as to the quality of the aberration correction. In at least one embodiment, epipolar-image (EPI) analysis can be used. FIG. 15 is a schematic block diagram that illustrates a system 1500 for assessing the quality of aberration correction. The system 1500 may be used to evaluate the corrected light-field data 1322. The system 1500 may include any computing device; in some embodiments, the system 1500 may reside on a computing device such as the device 501 of FIG. 5. Alternatively or additionally, the system 1500 may reside on a camera 800 such as that of FIG. 2 or a post-processing device connected to a camera 800 such as that of FIG. 3.

As shown, the system 1500 may utilize the further light-field processing engine 1330, and may further have an epipolar image processing engine 1520. The further light-field processing engine 1330 may be used to generate an epipolar image 1512 from the corrected light-field data 1322. Additionally, the product calibration data 940 and/or the unit calibration data 1140 may optionally be used.

The epipolar image 1512 may be created, for example, by taking a vertical or horizontal "slice" of the light-field data. The light-field data may be expressed in terms of u, v, x, and y coordinates, as described previously in connection with FIG. 7. A horizontal "slice" may be taken by keeping v and y (the vertical coordinates at the aperture plane and the image plane, respectively), constant. The resulting epipolar image 1512 may then have variation only in the x and u coordinates defining the horizontal slice. Vertical epipolar images 1512 may similarly be created.

The epipolar image processing engine 1520 may receive the epipolar image 1512, and may process the epipolar image 1512 to generate a correction score 1522 that indicates the quality of the aberration correction applied to the corrected light-field data 1322. The operation of the epipolar image processing engine 1520 will be described in greater detail in connection with FIG. 16.

Figure 16:
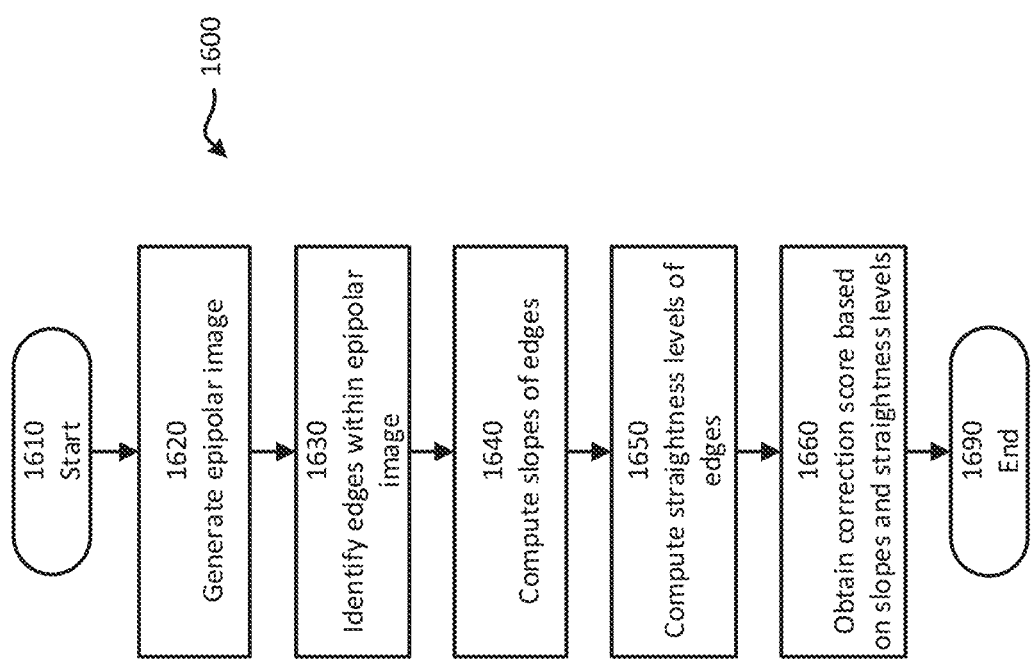
FIG. 16 is a flow diagram illustrating a method of using the system of FIG. 15 to generate the correction score.

FIG. 16 is a flow diagram illustrating a method 1600 of using the system 1500 of FIG. 15 to generate the correction score 1522. The method 1600 may optionally be performed after performance of the method 1400 of FIG. 14 so that the method 1600 can utilize the product calibration data 940 and the unit calibration data 1140. The method may start 1610 and proceed as follows:

Algorithm III: Generic Aberration Correction Quality Assessment

Input: Corrected light-field data 1322 and metadata of a specific test target, unit calibration data 1140, product calibration data 940.

Output: correction score 1522

1. Follow step 1 and 2 in Algorithm II to generate b and g.
2. In a step 1620, generate the EPI E with aberration correction
   a. For each sample (s, t)
      i. Compute $(x, y, u, v) = g(s, t)$
      ii. Compute $(x', y', u', v') = b(x, y, u, v)$
      iii. If $(y', v') = (0,0)$, set $E(x', u') = I(s, t)$
      iv. In a step 1630, identify the location of strong edges in E, for each edge
   b. In a step 1640, compute the slope 1 and the error to the expected slope as e(l)
   c. In a step 1650, compute straightness of each edge h.
3. In a step 1660, compute the correction score as sum of −e(l) and h for all edges Once this algorithm is complete, the method 1600 may end 1690. The epipolar image 1512, or EPI, may be a two-dimension slice of the four-dimensional light-field given one fixed image and one set of fixed aperture coordinates. In this algorithm, (y', v') may be fixed to (0,0) (2.a.iii in Algorithm III).

Figure 17A:
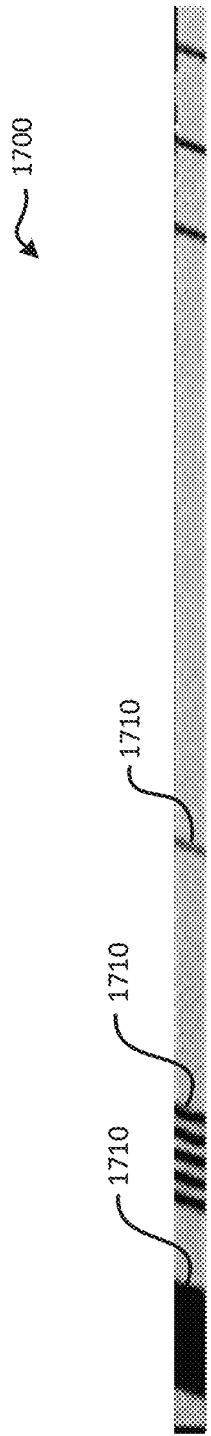
FIGS. 17A and 17B are exemplary epipolar images generated from corrected and uncorrected light-field data, respectively, according to one embodiment.

FIG. 17A illustrates an exemplary epipolar image 1700 generated from corrected light-field data 1322. The key property of an epipolar image may be that, for a specific target with known distance and texture, its epipolar image with aberration correction may only contain straight edges with known slopes (the edges 1710 of FIG. 17). Any deviation from this may indicate that the aberration correction has not applied perfectly. Such a deviation may be, for example, a deviation in the straightness and/or slope of one or more of the edges in the epipolar image.

Hence, the correction score 1522 may be based, at least in part, on the slopes and/or straightness levels of the edges in the epipolar image. The epipolar image may be analyzed by first running one or more common edge detection algorithms, and then measuring the slope and straightness of each edge (3 in Algorithm III). Finally, all slope error and straightness measurements may be combined together to compute the correction score 1522. The edges 1710 of the epipolar image 1700 are relatively straight and are relatively consistently-sloped; accordingly, the epipolar image 1700 may receive a correction score 1522 that indicates that aberration correction has been successfully applied.

Figure 17B:
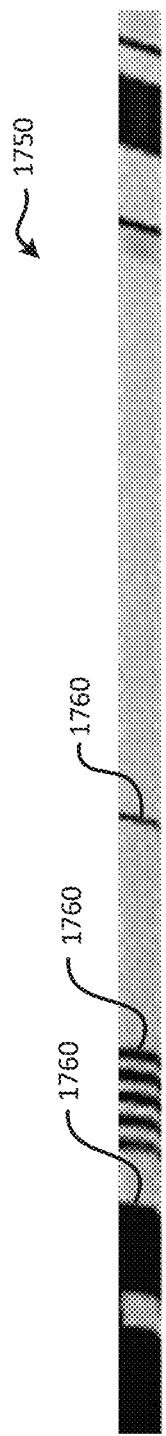

FIG. 17B illustrates an exemplary epipolar image 1750 generated from light-field data 1310 that has not been corrected for aberrations. The epipolar image 1750 has edges 1760 that do not have the same level of straightness and/or consistency of slope as the edges 1710 of the epipolar image 1700 of FIG. 17A. Accordingly, the epipolar image 1750 may receive a correction score 1522 that indicates that aberration correction has not been successfully applied.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for processing light-field data captured by a light-field image capture device having a sensor, a main lens, and a plurality of microlenses, the method comprising:
   in a processor, receiving light-field data and metadata from the light-field image capture device;
   in the processor, receiving product calibration data descriptive of a design departure of a main lens design of the main lens from an ideal main lens design;
   in the processor, receiving unit calibration data descriptive of a manufacturing departure of the main lens from the main lens design;
   in the processor, using the metadata, the product calibration data, and the unit calibration data to obtain corrected light-field data that at least partially compensates for the design departure and the manufacturing departure;
   in the processor, using the corrected light-field data during light field processing to create at least one output image; and
   initiating storage, in a data store, of the at least one output image.

2. The method of claim 1, wherein each output image comprises a light-field image.

3. The method of claim 1, further comprising, prior to receiving the unit calibration data, obtaining the unit calibration data by:

selecting a plurality of samples, each of which comprises a zoom setting and a focus setting for the light-field image capture devices;

in a processor, receiving a main lens design of the main lens and a sensor design of the sensor;

in the processor, for each sample, generating a mapping function that maps the sample to non-ideal light ray coordinates; and initiating storage, in a data store, of unit calibration data obtained from the mapping functions of the plurality of samples.

4. The method of claim 1, wherein the each output image comprises an epipolar image, the method further comprising:

at the processor, identifying edges within the epipolar image;

computing slopes of the edges;

computing straightness levels of the edges; and at the processor, using the slopes and the straightness levels to obtain a correction score indicative of a degree to which the corrected light-field data compensates for the design departure and the manufacturing departure.

5. The method of claim 1, further comprising, prior to receiving the product calibration data, obtaining the product calibration data by:

selecting a plurality of samples, each of which comprises a zoom setting and a focus setting for the light-field image capture device;

in a processor, receiving a main lens design of the main lens and a sensor design of the sensor;

in the processor, for each sample, ray tracing light-field capture at the sample in a virtual light-field capture device comprising the main lens design and the sensor design to generate a raw mapping table that maps each of a plurality of sensor locations on the sensor to ideal light ray coordinates; and initiating storage, in a data store, of product calibration data obtained from the raw mapping tables of the plurality of samples.

6. The method of claim 5, further comprising, at the processor and for each raw mapping table, generating a model that mathematically approximates the raw mapping table;

wherein initiating storage of the product calibration data comprises storing the model for each of the plurality of samples.

7. The method of claim 6, wherein, for each raw mapping table, generating the model comprises generating a selection from the group consisting of:

a polynomial function that can be used to approximate the raw mapping table, wherein the polynomial function can be applied to obtain the ideal light ray coordinates; and a low-resolution mapping table obtained by resampling and averaging data from the raw mapping table at a lower resolution such that, from the low-resolution mapping table, the ideal light ray coordinates are obtainable via interpolation.

8. The method of claim 1, wherein using the metadata, the product calibration data, and the unit calibration data to obtain corrected light-field data comprises:

for each of a plurality of sensor locations on the sensor, using the unit calibration data to obtain non-ideal light ray coordinates based on the light-field data.

9. The method of claim 8, wherein using the metadata, the product calibration data, and the unit calibration data to obtain corrected light-field data further comprises:

for each of the plurality of sensor locations on the sensor, using a reverse mapping function obtained from the product calibration data to obtain ideal light ray coordinates from the non-ideal light ray coordinates.

10. The method of claim 9, wherein using the metadata, the product calibration data, and the unit calibration data to obtain corrected light-field data further comprises:

at the processor, receiving, from the metadata, an actual zoom setting and an actual focus setting that were used to capture the light-field data;

locating a portion of the product calibration data that most closely pertains to the actual zoom setting and the actual focus setting; and obtaining the reverse mapping function based on the portion of the product calibration data.

11. The method of claim 9, wherein using the corrected light-field data to create the at least one output image comprises using the ideal light ray coordinates for each of the plurality of sensor locations to carry out one or more image processing steps selected from the group consisting of:

digital refocusing;

extended depth of field projection;

general projection;

light-field filtering;

denoising;

light-field resampling; and light-field image compression.

12. A computer program product for processing light-field data captured by a light-field image capture device having a sensor, a main lens, and a plurality of microlenses, the computer program product comprising:

a non-transitory storage medium; and computer program code, encoded on the medium, configured to cause at least one processor to perform the steps of:

receiving light-field data and metadata from the light-field image capture device;

receiving product calibration data descriptive of a design departure of a main lens design of the main lens from an ideal main lens design;

receiving unit calibration data descriptive of a manufacturing departure of the main lens from the main lens design;

using the metadata, the product calibration data, and the unit calibration data to obtain corrected light-field data that at least partially compensates for the design departure and the manufacturing departure;

using the corrected light-field data during light field processing to create at least one output image; and causing a data store to store the at least one output image.

13. The computer program product of claim 12, wherein each output image comprises a light-field image.

14. The computer program product of claim 12, wherein the computer program code is further configured to cause the at least one processor, prior to receiving the unit calibration data, to obtain the unit calibration data by:

selecting a plurality of samples, each of which comprises a zoom setting and a focus setting for the light-field image capture devices;

receiving a main lens design of the main lens and a sensor design of the sensor;

for each sample, generating a mapping function that maps the sample to non-ideal light ray coordinates; and causing a data store to store unit calibration data obtained from the mapping functions of the plurality of samples.

15. The computer program product of claim 12, wherein each output image comprises an epipolar image, wherein the computer program code is further configured to cause the at least one processor to perform the steps of:
  identifying edges within the epipolar image;
  computing slopes of the edges;
  computing straightness levels of the edges; and
  using the slopes and the straightness levels to obtain a correction score indicative of a degree to which the corrected light-field data compensates for the design departure and the manufacturing departure.

16. The computer program product of claim 12, wherein the computer program code is further configured to cause the at least one processor, prior to receiving the product calibration data, to obtain the product calibration data by:
  selecting a plurality of samples, each of which comprises a zoom setting and a focus setting for the light-field image capture device;
  receiving a main lens design of the main lens and a sensor design of the sensor;
  for each sample, raytracing light-field capture at the sample in a virtual light-field capture device comprising the main lens design and the sensor design to generate a raw mapping table that maps each of a plurality of sensor locations on the sensor to ideal light ray coordinates; and
  initiating storage of product calibration data obtained from the raw mapping tables of the plurality of samples.

17. The computer program product of claim 16, wherein the computer program code is further configured to cause the at least one processor, for each raw mapping table, to generate a model that mathematically approximates the raw mapping table;
  wherein the compute program code configured to cause the at least one processor to initiate storage of the product calibration data comprises computer program code configured to cause the at least one processor to initiate storage of the model for each of the plurality of samples.

18. The computer program product of claim 12, wherein the computer program code configured to cause the at least one processor to use the metadata, the product calibration data, and the unit calibration data to obtain corrected light-field data comprises computer program code configured to cause the at least one processor to perform the steps of:
  receiving, from the metadata, an actual zoom setting and an actual focus setting that were used to capture the light-field data;
  locating a portion of the product calibration data that most closely pertains to the actual zoom setting and the actual focus setting;
  obtaining a reverse mapping function based on the portion of the product calibration data;
  for each of a plurality of sensor locations on the sensor, using the unit calibration data to obtain non-ideal light ray coordinates based on the light-field data; and
  for each of the plurality of sensor locations on the sensor, using the reverse mapping function to obtain ideal light ray coordinates from the non-ideal light ray coordinates.

19. The computer program product of claim 18, wherein the computer program code configured to cause the at least one processor to use the corrected light-field data to create the at least one output image comprises computer program code configured to cause the at least one processor to use the ideal light ray coordinates for each of the plurality of sensor locations to carry out one or more image processing steps selected from the group consisting of:
  digital refocusing;
  extended depth of field projection;
  general projection;
  light-field filtering;
  denoising;
  light-field resampling; and
  light-field image compression.

20. A system for processing light-field data captured by a light-field image capture device having a sensor, a main lens, and a plurality of microlenses, the system comprising:
  a processor, configured to:
    receive light-field data and metadata from the light-field image capture device;
    receive product calibration data descriptive of a design departure of a main lens design of the main lens from an ideal main lens design;
    receive unit calibration data descriptive of a manufacturing departure of the main lens from the main lens design;
    use the metadata, the product calibration data, and the unit calibration data to obtain corrected light-field data that at least partially compensates for the design departure and the manufacturing departure; and
    use the corrected light-field data during light field processing to create at least one output image; and
  a data store, communicatively coupled to the processor, configured to:
    store the at least one output image.

21. The system of claim 20, wherein each output image comprises a light-field image.

22. The system of claim 20, wherein the processor is further configured, prior to receiving the unit calibration data, to obtain the unit calibration data by:
  selecting a plurality of samples, each of which comprises a zoom setting and a focus setting for the light-field image capture devices;
  receiving a main lens design of the main lens and a sensor design of the sensor;
  for each sample, generating a mapping function that maps the sample to non-ideal light ray coordinates; and
  initiating storage of unit calibration data obtained from the mapping functions of the plurality of samples.

23. The system of claim 20, wherein each output image comprises an epipolar image, wherein the processor is further configured to:
  identify edges within the epipolar image;
  compute slopes of the edges;
  compute straightness levels of the edges; and
  use the slopes and the straightness levels to obtain a correction score indicative of a degree to which the corrected light-field data compensates for the design departure and the manufacturing departure.

24. The system of claim 20, wherein the processor is further configured, prior to receiving the product calibration data, to obtain the product calibration data by:
  selecting a plurality of samples, each of which comprises a zoom setting and a focus setting for the light-field image capture device;
  receiving a main lens design of the main lens and a sensor design of the sensor;
  for each sample, ray tracing light-field capture at the sample in a virtual light-field capture device comprising the main lens design and the sensor design to generate a raw mapping table that maps each of a plurality of sensor locations on the sensor to ideal light ray coordinates; and initiating storage of product calibration data obtained from the raw mapping tables of the plurality of samples.

25. The system of claim 24, wherein the processor is further configured, for each raw mapping table, to generate a model that mathematically approximates the raw mapping table;

wherein the processor is further configured to initiate storage of the product calibration data by initiating storage of the model for each of the plurality of samples.

26. The system of claim 20, wherein the processor is further configured to use the metadata, the product calibration data, and the unit calibration data to obtain corrected light-field data comprises by:

receiving, from the metadata, an actual zoom setting and an actual focus setting that were used to capture the light-field data;

locating a portion of the product calibration data that most closely pertains to the actual zoom setting and the actual focus setting;

obtaining a reverse mapping function based on the portion of the product calibration data;

for each of a plurality of sensor locations on the sensor, using the unit calibration data to obtain non-ideal light ray coordinates based on the light-field data; and for each of the plurality of sensor locations on the sensor, using the reverse mapping function to obtain ideal light ray coordinates from the non-ideal light ray coordinates.

27. The system of claim 26, wherein the processor is further configured to use the corrected light-field data to create the at least one output image by using the ideal light ray coordinates for each of the plurality of sensor locations to carry out one or more image processing steps selected from the group consisting of:

digital refocusing;
extended depth of field projection;
general projection;
light-field filtering;
denoising;
light-field resampling; and
light-field image compression.

* * * * *

UNITED STATES PATENT AND TRADEMARK OFFICE
CERTIFICATE OF CORRECTION

PATENT NO. : 9,628,684 B2  
APPLICATION NO. : 14/573319  
DATED : April 18, 2017  
INVENTOR(S) : Chia-Kai Liang et al.

Page 1 of 1

It is certified that error appears in the above-identified patent and that said Letters Patent is hereby corrected as shown below:

In the Claims

Column 25, Line 35 (Claim 17): please replace "compute" with "computer"

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*